(12) United States Patent
Frisina

(10) Patent No.: US 7,467,161 B2
(45) Date of Patent: Dec. 16, 2008

(54) COMPUTER SYSTEM FOR MAINTENANCE RESOURCE OPTIMIZATION

(76) Inventor: Franklin Frisina, 5 Rochelle Dr., New City, NY (US) 10956

( * ) Notice: Subject to any disclaimer, the term of this patent is extended or adjusted under 35 U.S.C. 154(b) by 332 days.

(21) Appl. No.: 10/147,344

(22) Filed: May 15, 2002

(65) Prior Publication Data

US 2003/0187865 A1 Oct. 2, 2003

Related U.S. Application Data

(60) Provisional application No. 60/368,022, filed on Mar. 27, 2002.

(51) Int. Cl.
*G06F 7/00* (2006.01)
*G06F 17/00* (2006.01)
(52) U.S. Cl. ............... 707/104.1; 707/102; 700/99; 715/224
(58) Field of Classification Search .......... 707/101, 707/102, 100, 104.1, 1, 200, 10; 705/9, 1, 705/8, 7; 715/700, 740, 200, 221, 222, 224; 700/90, 99
See application file for complete search history.

(56) References Cited

U.S. PATENT DOCUMENTS

| | | | | |
|---|---|---|---|---|
| 6,006,171 A * | 12/1999 | Vines et al. | ............... | 702/184 |
| 6,092,050 A * | 7/2000 | Lungren et al. | ............... | 705/10 |
| 6,345,281 B1 * | 2/2002 | Kardos et al. | ............... | 707/201 |
| 6,385,621 B1 * | 5/2002 | Frisina | ............... | 707/104.1 |
| 6,505,145 B1 * | 1/2003 | Bjornson | ............... | 702/185 |
| 6,681,232 B1 * | 1/2004 | Sistanizadeh et al. | .... | 707/104.1 |
| 6,941,514 B2 * | 9/2005 | Bradford | ............... | 715/700 |
| 7,269,569 B2 * | 9/2007 | Spira et al. | ............... | 705/7 |
| 2001/0039594 A1 * | 11/2001 | Park et al. | ............... | 709/311 |
| 2002/0156692 A1 * | 10/2002 | Squeglia et al. | | |
| 2003/0018508 A1 * | 1/2003 | Schwanke | ............... | 705/9 |
| 2003/0018952 A1 * | 1/2003 | Roetzheim | | |
| 2003/0050812 A1 * | 3/2003 | Clark, III et al. | | |
| 2003/0066030 A1 * | 4/2003 | Curns et al. | | |
| 2003/0106039 A1 * | 6/2003 | Rosnow et al. | | |
| 2003/0135401 A1 * | 7/2003 | Parr | | |
| 2003/0177051 A1 * | 9/2003 | Driscoll et al. | ............... | 705/9 |
| 2003/0179790 A1 * | 9/2003 | Kinsella | | |
| 2004/0162811 A1 * | 8/2004 | Wetzer et al. | | |

* cited by examiner

*Primary Examiner*—Greta L Robinson
(74) *Attorney, Agent, or Firm*—George R. McGuire; Bond Schoeneck & King, PLLC

(57) ABSTRACT

A computer based maintenance resource management system has an operations software component with access to historical operations requirements such that job plans for the current operations and safety requirements can be integrated with work orders, allowing operations personnel to review, approve or modify the requirements such that the job plan and work orders can be issued without lost time or productivity as maintenance and operations are fully coordinated.

9 Claims, 31 Drawing Sheets

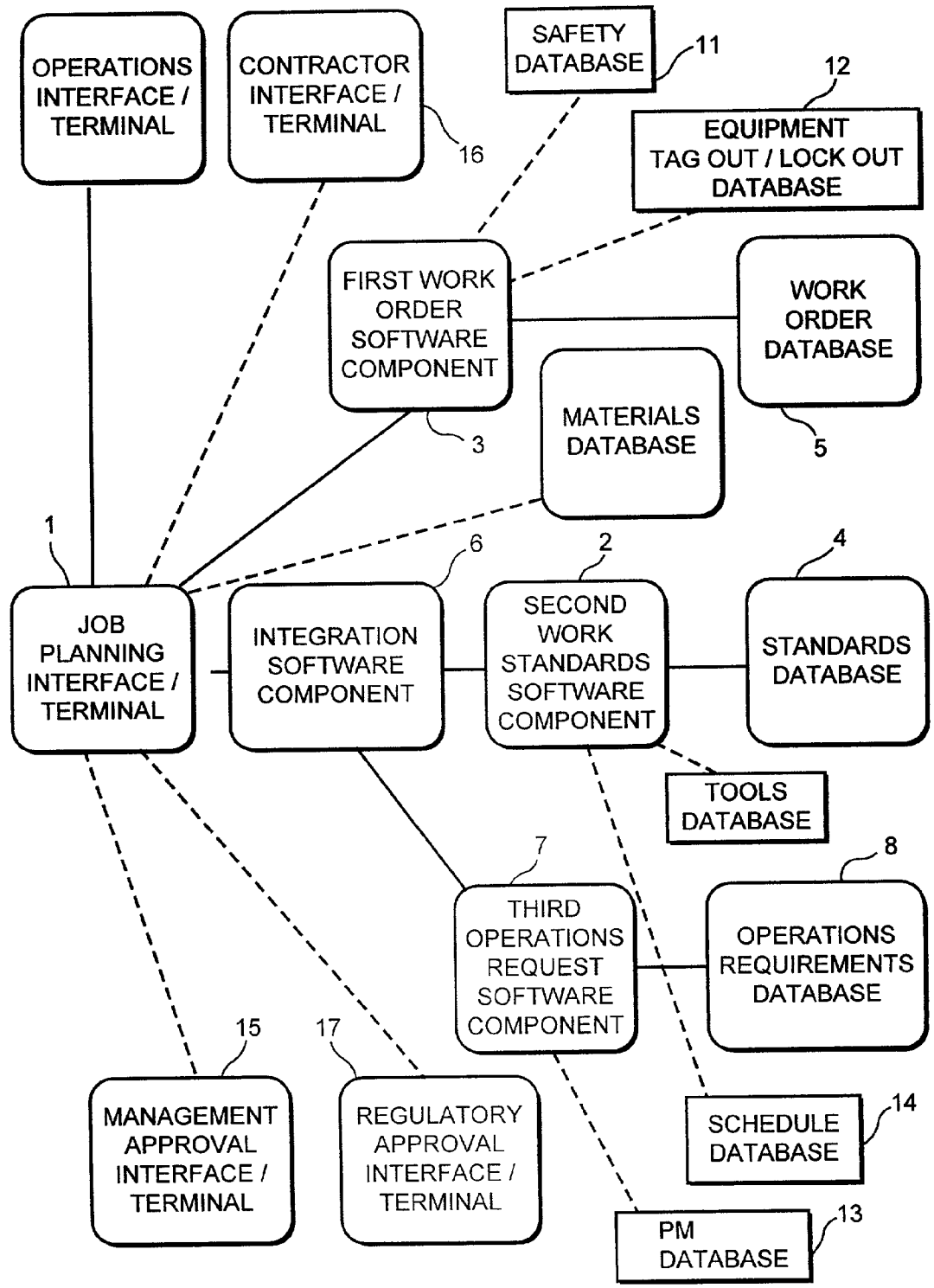
F I G. 1

FIG. 2A

Work Order to PTR-Plus! Request

File  Edit  Search  View  Item

Search on any of this Work Order fields below to find other Work Orders or Requests with the same information:

| WO has Parent/Child Hierarchy? | NO | | Search Maximo WO's | Search PTR-Plus! Requests |
| Work Group: | SAFETY | | Search Maximo WO's | Search PTR-Plus! Requests |
| Event 1: | | | Search Maximo WO's | Search PTR-Plus! Requests |
| Calendar: | DAYSHIFT | | Search Maximo WO's | Search PTR-Plus! Requests |
| Facility 1: | | | | |
| Equipment Number: | 31 | | | |

The following Requests were found for Work Order #: 71845

Browse / Request / Limits / Additional Request Info / Grounds / Sign-ons / Work Orders / Approvals

| Order Status | Start | Equipment or Lines to be Cleared | Requested By | Request # | Order # | Type | Purpose | Stop | Locat |
|---|---|---|---|---|---|---|---|---|---|
| DRAFT | 01/02/2002 0700 | GENERAL PLANT | M | 1176 | | Clearance | First Aid, CPR | 12/31/2002 1530 | NIAG |
| DRAFT | 01/02/2002 0700 | GENERAL PLANT | M | 1177 | | Clearance | First Aid, CPR | 12/31/2002 1530 | NIAG |
| DRAFT | 01/02/2002 0700 | GENERAL PLANT | M | 1178 | | Clearance | First Aid, CPR | 12/31/2002 1530 | NIAG |
| DR. WAIT | 01/02/2002 0700 | GENERAL PLANT | M | 1179 | | Clearance | First Aid, CPR | 12/31/2002 1530 | NIAG |
| DR. WAIT | 01/02/2002 0700 | GENERAL PLANT | M | 1193 | | Clearance | First Aid, CPR | 12/31/2002 1530 | NIAG |
| DRAFT | 01/02/2002 0700 | OC8 1022 | M | 1195 | | Clearance | Annual Maintai | 12/31/2002 1530 | NIAG |
| DRAFT | 01/02/2002 0700 | GENERAL PLANT | M | 1196 | | Special Co | Annual Maintai | 12/31/2002 1530 | NIAG |

Select Request | Create New Request | Clone a Request | Print List of Requests/ WO's | Return to Job Plan

Standard Limits of Protection

| Field | Value |
|---|---|
| Equipment/line: | ENERGY CONTROL CENTER |
| Facility 1: | CEC |
| Location: | |
| EQNUM: | 52076 |
| Project: | NIAGARA |
| Purpose: | ECC RENOVATIONS (MASTER WO) |

Browse / Form / Limits of Protection

| Field | Value |
|---|---|
| Project: | Niagara |
| Type: | Clearance |
| Equipment/line: | ENERGY CONTROL CENTER |
| Purpose: | ECC RENOVATIONS (MASTER WO) |
| | EQNUM: 52076 |

Preventive Maintenance # (PMNUM) of the PM these Standard Limits are assigned to:

Preventive Maintenance #: 52943    (Reference to PMNUM in the PM table)

Standard #: 1    (Number assigned to PM17 in the PM table)

Save    Cancel

Create a new Request

File  Edit  Item

Current Request Detail

| | | |
|---|---|---|
| Project: | Niagara | Request#: 1198 |
| Equipment/Line: | GENERAL PLANT | Order#: |
| Facility1: | | Type: Clearance |
| Location: | NIAGARA PROJECT | Status: DRAFT |
| Equipment#: | 31 | |
| Purpose: | FIRST AID, CPR & AED -2002- GENERATION | |

Request / Limits / Additional Request Info / Grounds / Sign-ons / Work Orders / Approvals Limits of Protection Created From: Standard

```
DISCONNECT 1001 OL&T
DISCONNECT 1003 OL&T
FUSE 1-N-1 CTRL POWER TRIP COIL 2 OFF AND TAG
FUSE 1-N-7 CTRL POWER TRIP COIL 1 OFF AND TAG
FUSE 1-N-8 FAILURE TIMER OFF AND TAG
FUSE C-5-5 INTERPOSING RELAY OFF AND TAG
SWITCH 69 LOCAL/REMOTE IN LOCAL POSITION AND TAG
```

IF THIS BREAKER IS COMING OUT FOR TIMING OR MAINTENANCE DON'T FORGET YOU MIGHT NEED THE 2ND TRIP COIL ON SPC.

Select Limits from Standards by Equipment/Line  |  Select Limits from History Requests by Equipment/line
Select Limits from Standards by EQNUM  |  Select Device  |  Select Limits from History Requests by EQNUM Save  |  Cancel  |  Draft Waiting OK  |  Close

Select Standard Limits of Protection

File  Edit  Search  View  Item

Equipment/line: ENERGY CONTROL CENTER         Project: Niagara

Facility 1:

Location: CEC                                  Purpose:

EQNUM: 52076                                   ECC RENOVATIONS (MASTER WO)

Browse | Form | Limits of Protection

| Equipment/Line | EQNUM | Project Name | Type | Purpose |
|---|---|---|---|---|
| ENERGY CONTROL CENTER | 52076 | Niagara | Clearance | ECC REM |
| FAKE EQUIPMENT | 54000 | Niagara | Clearance | For searc |

Save    Cancel    Copy Limits of Protection

FIG. 7

(Rotated screenshot of Request dialog)

Request — File, Edit, Item

Current Request Detail

- Project: Niagara
- Equipment/Line: GENERAL PLANT
- Facility 1:
- Location: NIAGARA PROJECT
- Equipment#: 31
- Purpose: FIRST AID, CPR & AED -2002- GENERATION

- Request#: 1176
- Order#:
- Type: Clearance
- Status: DRAFT

Tabs: Request / Limits / Additional Request Info / Grounds / Equipment/line / Sign-ons / Work Orders / Approvals

| Work Order # | Equipment # | Equipment/line | Start | Stop | Requested By |
|---|---|---|---|---|---|
| 71845 | 31 | GENERAL PLANT | 01/02/2002 0700 | 12/31/2002 1530 | |

Buttons: Add, Delete, Copy this WO's Equipment/Purpose to Request, Save, Cancel, Draft Waiting OK, Close

Select Request

File  Edit  Search  Item

Current Request Detail | Current Filter

Project: Niagara  
Equipment/Line: ANALOG TELEMETRY  
Facility1:  
Location: ECC  
Equipment#: 52031  
Purpose: ECC RENOVATIONS: DOCUMENTATION OF VSS SYSTEM Request#: 8  
Order#:  
Type: Clearance  
Status: DRAFT WAITING OK Browse | Request | Limits | Additional Request Info | Grounds | Sign-ons | Work Orders | Approvals

| Order Status | Start | Equipment or Lines to be Cleared | Requested By | Request # | Order # | Type |
|---|---|---|---|---|---|---|
| DRAFT WAITING O | 11/15/2001 0700 | ENERGY CONTROL CENTER | T | 7 | | Clearance |
| DRAFT WAITING O | 11/15/2001 0700 | ANALOG TELEMETRY | T | 8 | | Clearance |

Add Work Order to Request:   Select Request   Print List of Requests/WO's   Close

WO's associated to WO # 71845 by calendar

| Work Order # | Description | Equipment# | Equipment Location | Start | Finish |
|---|---|---|---|---|---|
| 16182 | PAD FOUNDATIONS REPAIR 115 KV, BAY #12 | 181 | SWITCHYARD | | |
| 16185 | PAD FOUNDATIONS REPAIR 115 KV, BAY #14 | 181 | SWITCHYARD | | |
| 16186 | PAD FOUNDATIONS REPAIR 115 KV, BAY #15 | 181 | SWITCHYARD | | |
| 16187 | PAD FOUNDATIONS REPAIR 115 KV, BAY #16 | 181 | SWITCHYARD | | |
| 16188 | PAD FOUNDATIONS REPAIR 115 KV, BAY #17 | 181 | SWITCHYARD | | |
| 16189 | PAD FOUNDATIONS REPAIR 115 KV, BAY #18 | 181 | SWITCHYARD | | |
| 16191 | PAD FOUNDATIONS REPAIR 115 KV, BAY #19 | 181 | SWITCHYARD | | |
| 16307 | PAD FOUNDATIONS REPAIR 115 KV, BAY #21 | 181 | SWITCHYARD | | |
| 16308 | PAD FOUNDATIONS REPAIR 115 KV, BAY #22 | 181 | SWITCHYARD | | |
| 16309 | PAD FOUNDATIONS REPAIR 115 KV, BAY #23 | 181 | SWITCHYARD | | |
| 16310 | PAD FOUNDATIONS REPAIR 115 KV, BAY #24 | 181 | SWITCHYARD | | |
| 16311 | PAD FOUNDATIONS REPAIR 115 KV, BAY #25 | 181 | SWITCHYARD | | |
| 16312 | PAD FOUNDATIONS REPAIR 115 KV, BAY #26 | 181 | SWITCHYARD | | |
| 16313 | PAD FOUNDATIONS REPAIR 115 KV, BAY #27 | 181 | SWITCHYARD | | |
| 16314 | PAD FOUNDATIONS REPAIR 115 KV, BAY #28 | 181 | SWITCHYARD | | |

→ SEE FIG. 10B

F I G. 10A

| | | | | |
|---|---|---|---|---|
| 22561 | INSTALL FALL RESTRAINT BRACKETS 230 KV | | | 10/22/1997 16 |
| 22564 | INSTALL FALL RESTRAINT BRACKETS 230 KV | 24078 | 10/21/1997 | 10/24/1997 16 |
| 27875 | 13.8 SS CONTROL RELOCATION DWG AS BUI | 24092 | 10/23/1997 | |
| 28071 | TV BLDG FIRE PNL AS BUILT DRAFTING (D98- | 181 | 05/11/1998 0700 | 07/11/1998 15 |
| 29993 | MATERIAL FOR UPG 6 / FOR PROJECT MANAG | 7235 | 05/13/1998 1232 | |
| 30079 | DRAFT STATUS BOARD COMMENTS | 30898 | 07/17/1998 0734 | 03/31/1999 15 |
| 32255 | 2 YEAR LP INSPECT SUBSTATION SWITCH GE | 7090 | | |
| 33662 | 2 YEAR RM INSPECT MOTOR CONTROL CENT | 4376 | 06/27/2000 | 06/29/2000 |
| 33663 | 2 YEAR RM INSPECT MOTOR CONTROL CENT | 3498 | 04/23/2001 | 10/02/2001 |
| | | 1904 | 04/23/2001 | 04/11/2001 |

↑ SEE FIG. 10A

LPGP
LPGP
RM
RM
RM
LPGP
RM
RM

[Create New Request Using These Work Orders] [Clone Request] [Print List of WO's] [✗ Cancel]

FIG. 10B

WO's associated to WO # 71845 by Equipment Number

| Work Order # | Description | Equipment # | Equipment Location | Start | Finish |
|---|---|---|---|---|---|
| 40954 | 96-48 RE-CAULK & PAINT EXT. SOFFIT TUNN | 31 | NIAGARA PROJECT | | |
| 46818 | CARPENTER/LAYOUT/MASTER | 31 | NIAGARA PROJECT | 01/24/2000 0700 | 12/29/2000 15 |
| 46821 | MASON/LAYOUT | 31 | NIAGARA PROJECT | 01/24/2000 0700 | 12/29/2000 15 |
| 46822 | PAINTING/LAYOUT | 31 | NIAGARA PROJECT | 01/24/2000 0700 | 12/29/2000 15 |
| 46823 | PLUMBING/LAYOUT | 31 | NIAGARA PROJECT | 01/24/2000 0700 | 12/29/2000 15 |
| 46824 | SHEETMETAL/LAYOUT | 31 | NIAGARA PROJECT | 01/24/2000 0700 | 12/29/2000 15 |
| 53753 | 99-7 LPGP CONC. RETAINING WALL REPAIR | 31 | NIAGARA PROJECT | | |
| 54036 | 99-24 PAINT CRANE STOPS RMNPP INTAKE | 31 | NIAGARA PROJECT | | |
| 54059 | NIAGARA PROJECT ETHICS TRAINING - ALL | 31 | NIAGARA PROJECT | 08/16/2000 | 08/31/2000 |
| 54570 | OPEN ORDER RENEWAL - EMPIRE BUILDER | 31 | NIAGARA PROJECT | | |
| 55092 | SAFETY COMITTEE INSPECTION AUDIT | 31 | NIAGARA PROJECT | 10/02/2000 0700 | 10/30/2000 15 |
| 57038 | FINISH FIRE SYSTEM | 31 | NIAGARA PROJECT | 10/23/2000 0700 | 10/31/2000 15 |
| 57559 | SPDS EMERGENCY REACTION JOBS(PRI.3) | 31 | NIAGARA PROJECT | 11/08/2000 0700 | 12/29/2000 15 |
| 58239 | SHEETMETAL SUPPORT FOR SMALL JOBS 2- | 31 | NIAGARA PROJECT | 11/29/2000 0700 | 12/31/2001 15 |
| 58743 | TRAINING FOR 2001 FIRST AID FOR GENERA | 31 | NIAGARA PROJECT | 01/15/2001 1416 | 01/19/2001 14 |

SEE FIG. 11B

F I G. 11A

| | | ↑ SEE FIG. 11A | | |
|---|---|---|---|---|
| 59657 | TOP STEP AT ADMIN BUILDING IS RAISED | 31 | NIAGARA PROJECT | |
| 59734 | CUT A DEEPER TRENCH BEHIND CONF. RM | 31 | NIAGARA PROJECT | |
| 59911 | FAB DECK FOR BREAKER SWITCH YARD | 31 | NIAGARA PROJECT | 02/20/2001 0700 02/28/2001 15 |
| 60311 | ELECTROMAGNETING INSPECTION OF CABLE | 31 | NIAGARA PROJECT | |
| 60325 | GM JOB ASSESSMENT (LABOR ONLY) | 31 | NIAGARA PROJECT | 02/01/2001 0700 02/28/2001 15 |
| 60344 | JANITORIAL-STUP FOR MEETINGS | 31 | NIAGARA | 01/01/2001 0700 12/28/2001 15 |
| 60565 | ENGINEER SERVICES FOR REPAIRS AT PO | 31 | NIAGARA PROJECT | |
| 60729 | ADMINISTRATION BLDG. SMOKING PERMITTE | 31 | NIAGARA PROJECT | |
| 60861 | 99-5 INVESTIGATE SINK HOLES STORM SEWE | 31 | NIAGARA PROJECT | |

[Create New Request Using These Work Orders] [Clone Request] [Print List of WO's] [✗ Cancel]

| | PROJECT WORK ORDER | PAGE 1 |
|---|---|---|

WORKORDER: 103612                                                MASTER WO:

OCB 2514 CONTROL RELAY TRIP TEST

PM: 13455                                         WORK GROUP: M17PC25R
SCHEDULED START DATE: JUL 24, 2002                JOB PLAN: 10690
SCHEDULED COMP DATE: JUL 24, 2002                 PROGRAM: PM
LAST COMP DATE: JUL 21, 2000                      PRIORITY: 1
STATUS CODE: SCHED                                FREQUENCY: 2 YEARS
INITIATION DATE: MAR 21, 2002                     ACTIVITY: FUNCTIONAL TEST
REQUESTED BY: BAKER                               SUB-ACTIVITY: TRIP TEST
EVENT 1: OCB 2514                                 DURATION: 3 HRS
                                                  EVENT 2:

EQUIPMENT:                                        LOCATION
10679                                             POWER DAM
OCB 2514 CONTROL RELAYING                         3 RD FL EL 237.0
FAILURE CODE:                                     IS5 CONTROL RM
PROBLEM CODE:                                     MCB10F

SUPERVISOR:
TESTSV                      LEADCRAFT: TECHER

OPERATIONS COORDINATION REQUESTS

| Req Num | Status | Type | Order Num | Request By | Start Date | Stop Date |
|---|---|---|---|---|---|---|
| 164 | DRAFT | Special Condition | | BAKER TOM | 07/24/02 | 07/24/02 |

SAFETY AND SUPPORT INFORMATION 1.0 JOB SAFETY ANALYSIS:
    PERSONAL PROTECTIVE EQUIPMENT REQUIRED

_____          _____          _____
Date Completed              Completed By                Supervisor ENTER COMPLETION COMMENTS BELOW OR ATTACH A SEPARATE SHEET IF MORE SPACE IS REQUIRED WORKPLAN EVALUATION: If the workplan was complete as provided, check here: ☐
Otherwise check any item that was incomplete or needs improvement:
          ☐ Operational Steps    ☐ Craft Requirements    ☐ Materials
          ☐ Documents            ☐ Job Safety Analysis   ☐ Tools
(LAST EVALUATION: D)

WORK ORDER: 103612                                                05/09/2002

FIG. 28

COMPUTER SYSTEM FOR MAINTENANCE RESOURCE OPTIMIZATION

CROSS-REFERENCE TO RELATED APPLICATIONS

The present application claims priority to U.S. Provisional Application No. 60/368,022, filed on Mar. 27, 2002, entitled "Computer System for Maintenance Resource Organization."

TECHNICAL FIELD

This invention relates to computer software for managing work assignments in an industrial or commercial facility and more particularly to optimized resource management through integration of operations planning in job planning and work order generation.

BACKGROUND

It is important, particularity in larger industrial facilities, to properly and timely coordinate workers, equipment and materials to complete repairs and to complete preventive maintenance programs. Discrepancies in the allocation of these resources can result in significant equipment downtime and increased labor cost.

Software is available which is useful for establishing job plans and work plans. One such job planning software package is known as MAXIMO, a program developed and available from PSDI, Inc. This program assists a user in developing the actual work orders which will be issued to a work crew.

Another software program available which is useful in resource planning is a job standards program used to create, maintain and manipulate standards for maintenance work, that details the steps to be taken, materials and man hours/trades needed to complete a task, allowing a user to construct new standards using information retained in the database. For example AutoMOST™, available from H. B. Maynard and Company, Inc. is a software program that can perform this function.

In the present applicants' pending U.S. patent application Ser. No. 09/443,649 filed Nov. 19, 1999 a software system for integrating and enhancing these programs for improved job planning in the preparation of work orders, using the job standards program is disclosed. However, while the integrated system improves planning on the maintenance resource side, there still remains the problem of efficiently coordinating with operations.

A typical work order will involve either preventive maintenance or emergency repair of equipment needed by operations. Before work can begin, steps must be taken by operating personnel for securing the equipment, and otherwise preparing for the mechanics to safely complete the assigned task. With preventive maintenance, scheduling is important, particularly if the time required will impact production. Should a work order be generated, without operations input, a mechanic may arrive to perform the work without the preliminary preparations having been completed. This can result in significant lost time as the mechanic waits for the necessary preparations to be completed with a consequent loss in productivity.

SUMMARY OF THE INVENTION

It is an object of the present invention to provide a computer software supported maintenance resource system which integrates job planning with operations through a common interface to optimize maintenance planning, execution and completion.

It is another object to provide a computer based maintenance resource system which enables a planner to utilize an integrated job planning and standards development program with real time input from operations to enable the planner to generate a coordinated, and thus optimized, work plan.

It is yet another object to reduce lost work time and avoid prolonged or untimely production interruptions by allowing operations to communicate as to equipment status and availability prior to a mechanic being assigned the maintenance task.

It is yet another object to provide a software program which allows operations to review, revise, approve or disapprove a generated work order, for example, relative to the date and time specified equipment will be removed from service and returned to service.

It is yet another object to enable distributed input into the approval of work to be performed, such that operators, supervisors, managers and others can efficiently participate in the approval of work to be performed.

It is yet another object to enable operations to designate a zone of protection for safely completing maintenance tasks, via an operations interface.

These and other objects of the present invention are achieved by a computer based maintenance resources system comprising:

a user accessible computer terminal;

a software program for producing a job plan and work orders based on information supplied by the user, the software program being accessible via the computer terminal;

a job planning software component for use with the software program for enabling generation of a job plan and related work orders; and, an operations interface for use with the software program for enabling operations input related to the produced job plan, the software program having means for integrating the operations input into the job plan for use in scheduling and assigning resources to execute the job plan.

Utilizing an operations interface enables a job planner to, in real time, query operations personnel on equipment status, and availability for completing the job plan. If not available, the planner may allocate maintenance resources to other tasks available for completion. If available, the job planner can complete the job plan, integrate specific comments from operations into computer generated work orders and initiate execution of the job plan. This system provides a means to optimize maintenance resource allocation, and is particularly useful in preliminary securement of necessary safety permits and equipment lock outs so as to avoid delays when the mechanics arrive at a work site as the work order can be held pending confirmation that all lock-outs have been placed and the necessary safety permits have been issued prior to issuing the work orders. This also provides a means for operational concerns to be integrated with needed maintenance. For example, if a critical piece of equipment needs to be taken off-line, a hierarchy of approvals can be displayed on the operations interface and distributed so that complete oversight is assured, with work not commencing until the highest level of approval is received.

BRIEF DESCRIPTION OF THE DRAWINGS

FIG. 1 is an overview diagram of the system according to the present invention.

FIG. 3 is an illustration of a work order search screen.

Figure 9:
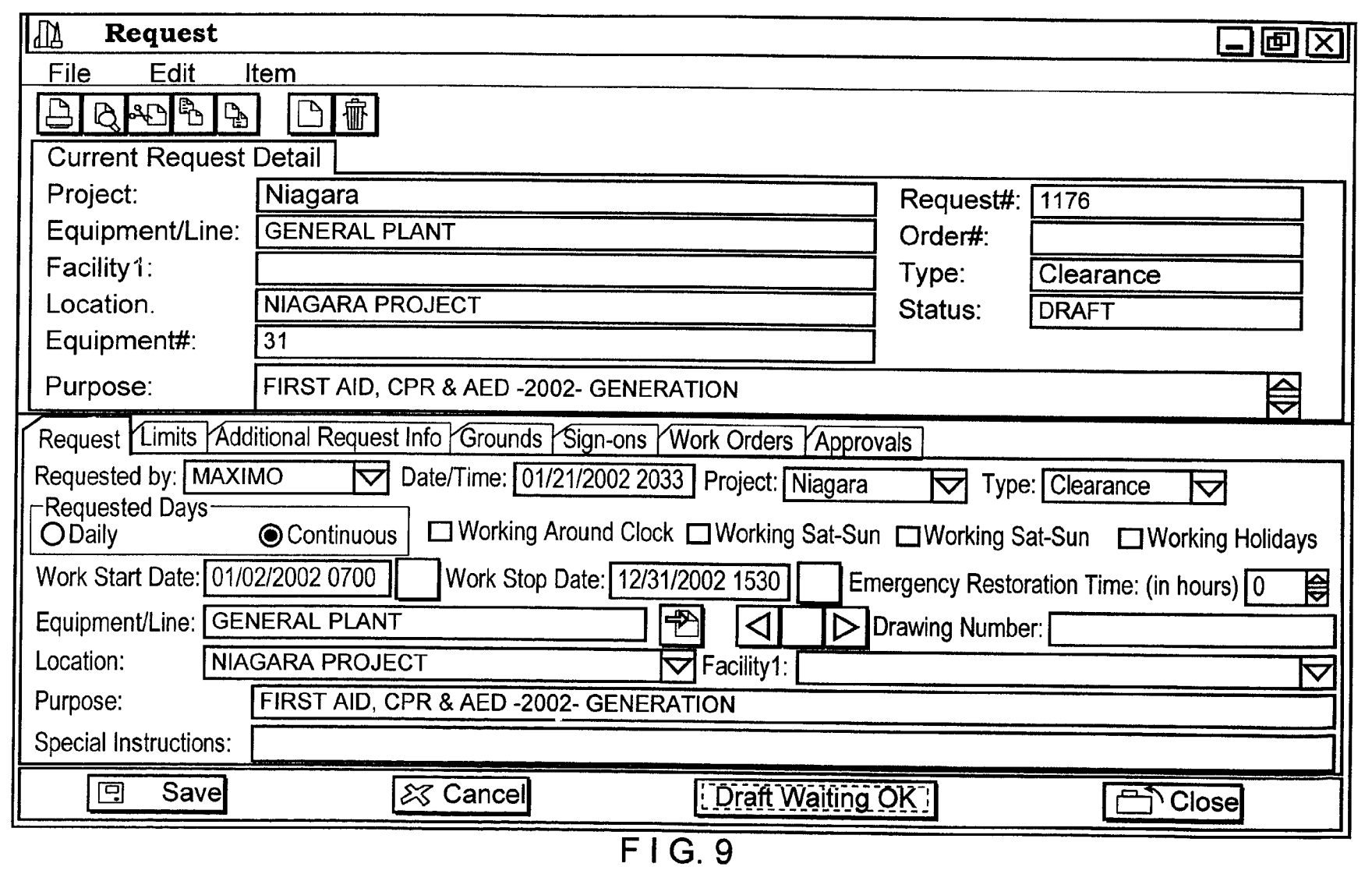

FIGS. 4-11 illustrate different display screens, showing typical fields, tabs and action buttons available to the user.

FIG. 27 is an illustration of a preventative maintenance screen.

FIG. 28 is an illustration of a print out of a generated work order.

DETAILED DESCRIPTION OF THE INVENTION

Figure 2B:
FIG. 2 is an illustration of a work order main screen.
Figure 12:
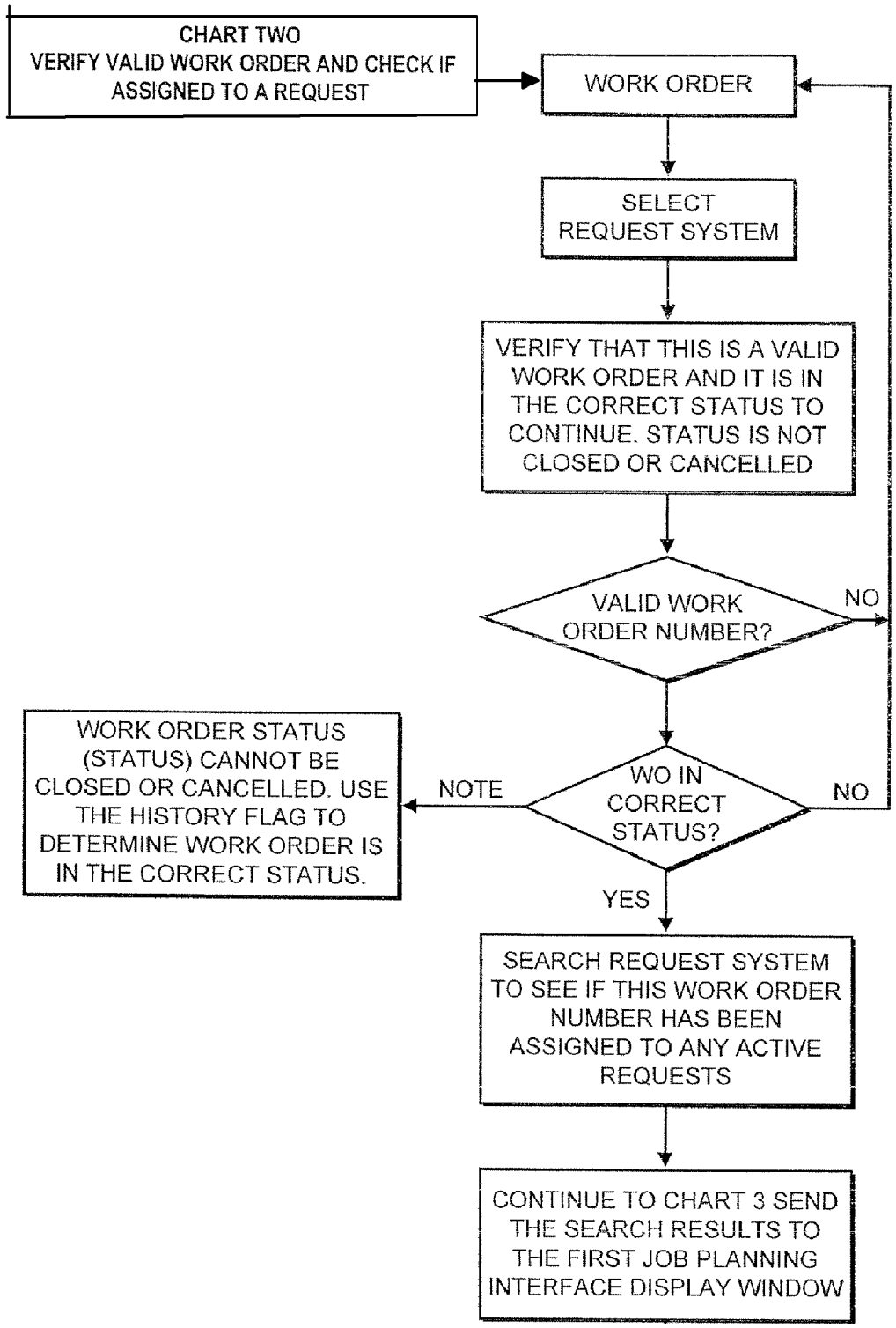
FIGS. 12-26 illustrate in a logic flow diagram the various steps undertaken when using the system of the invention.
Figure 13:
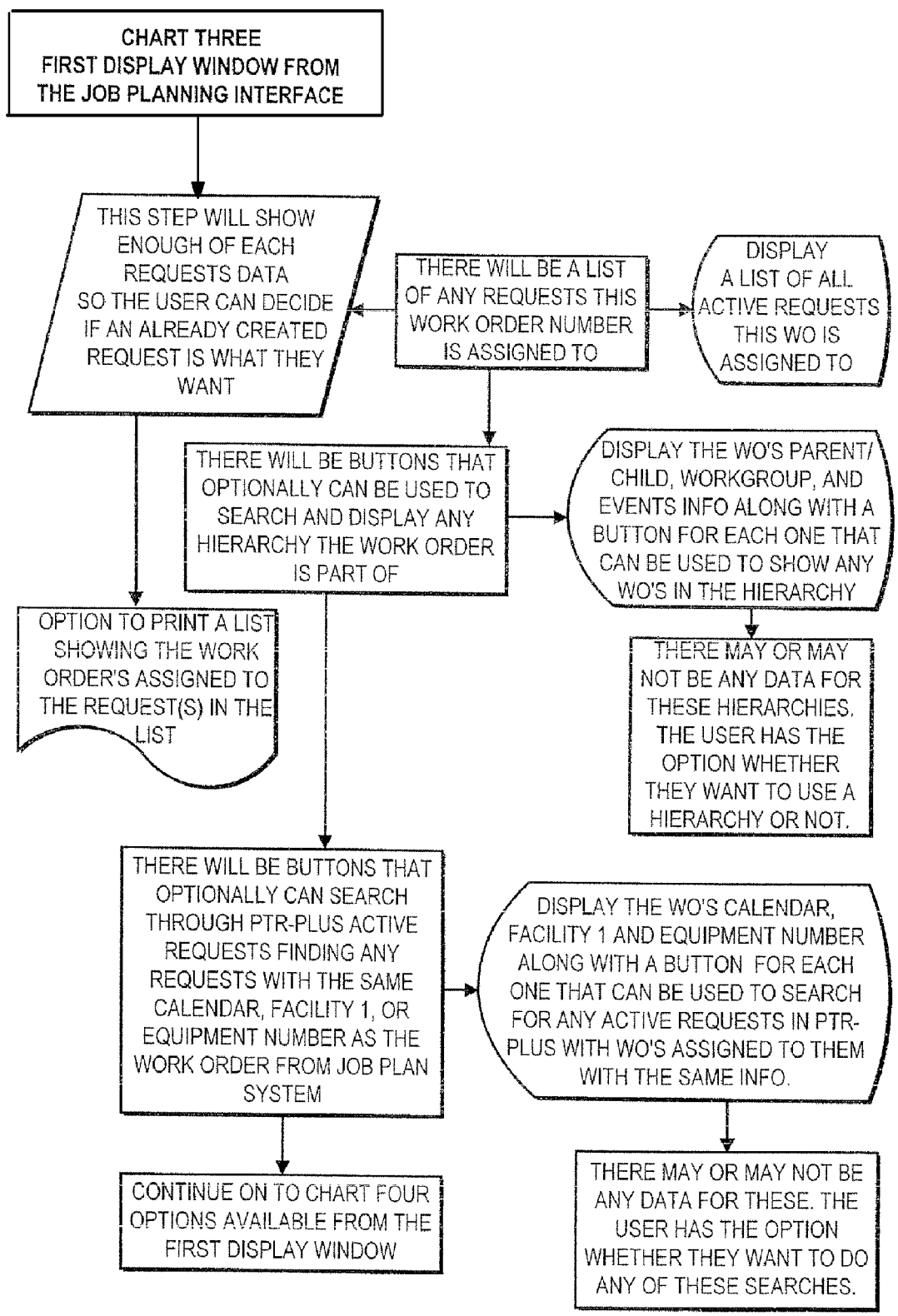
Figure 14:
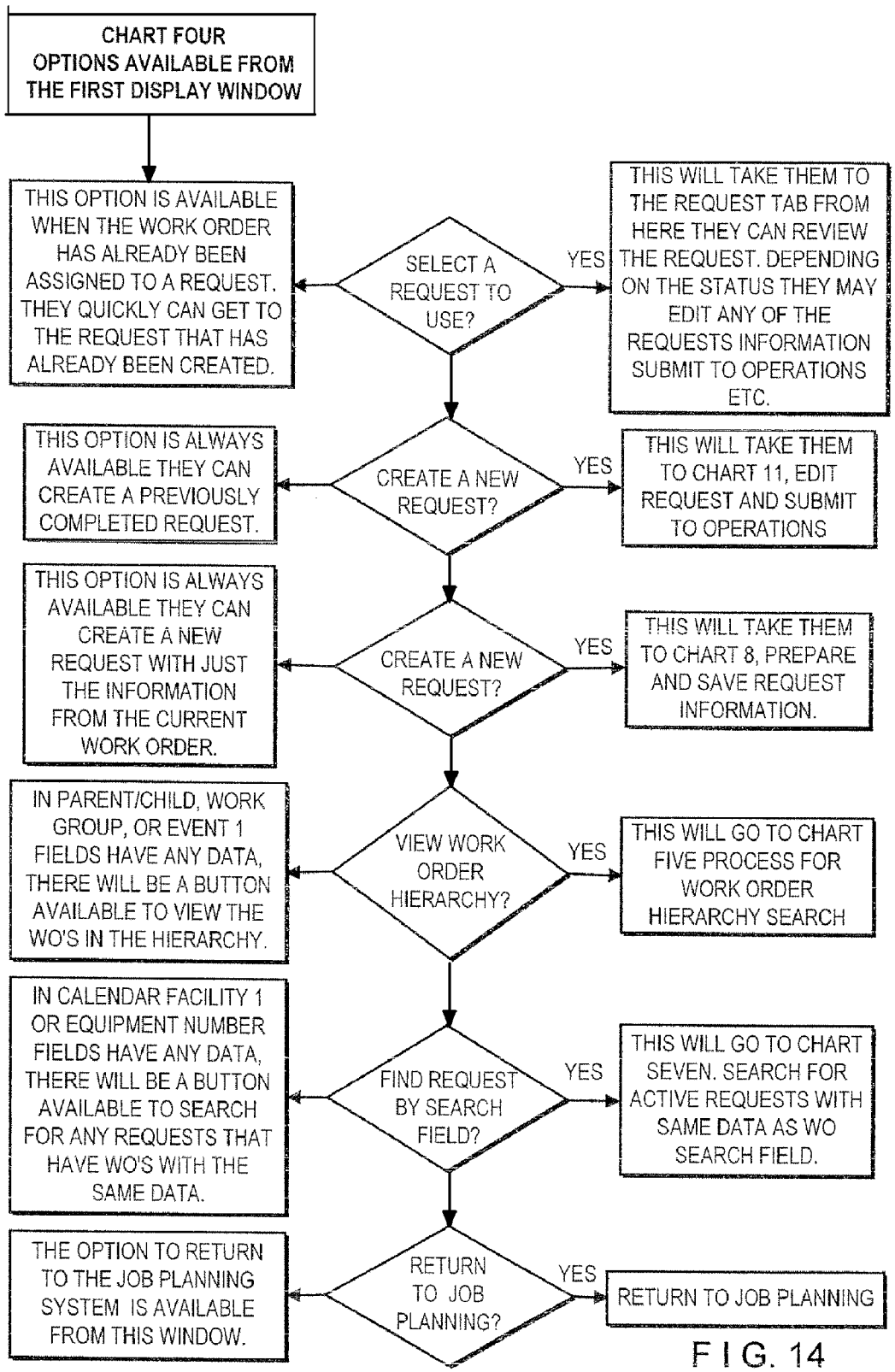
Figure 15:
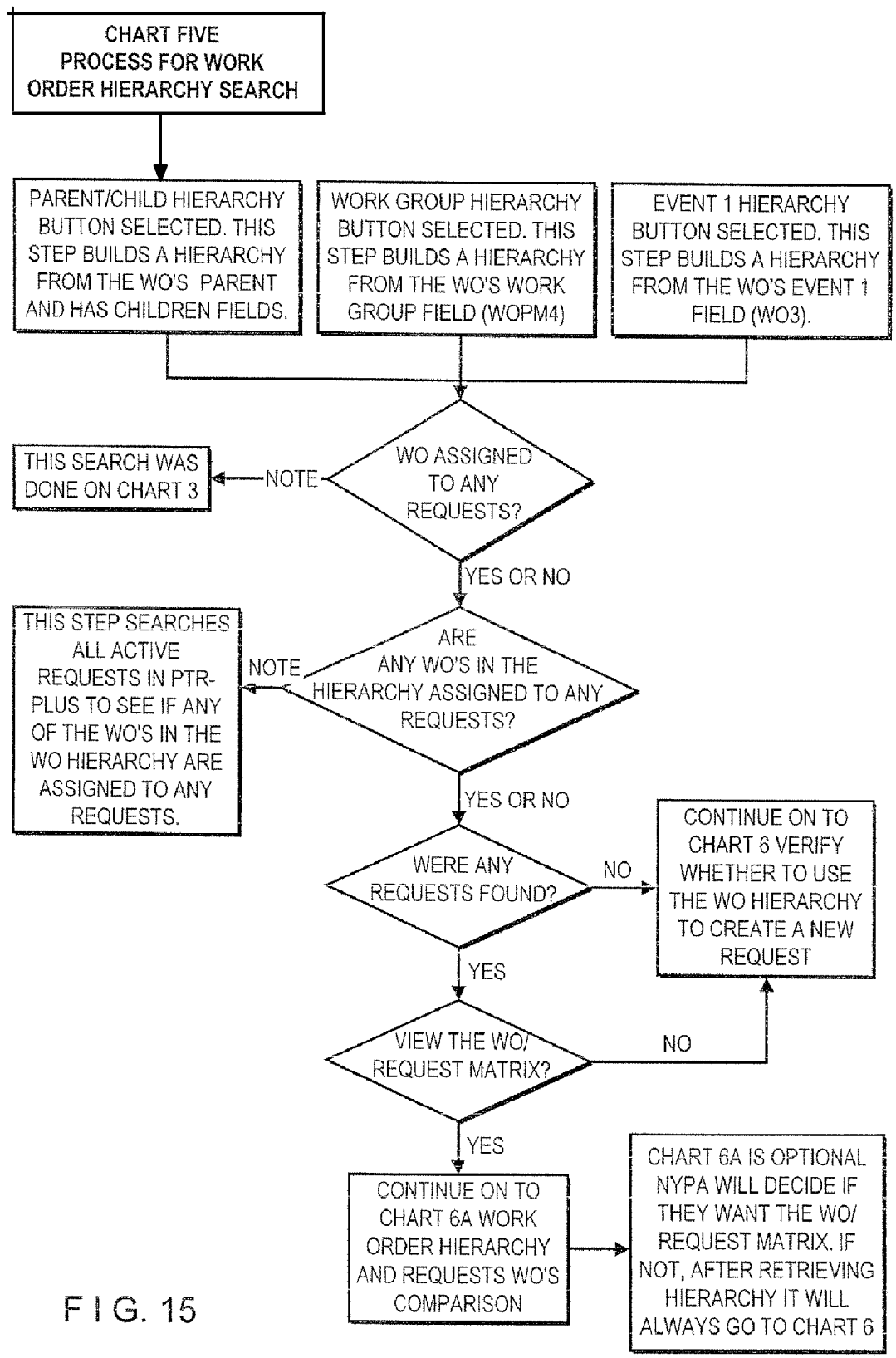
Figure 16:
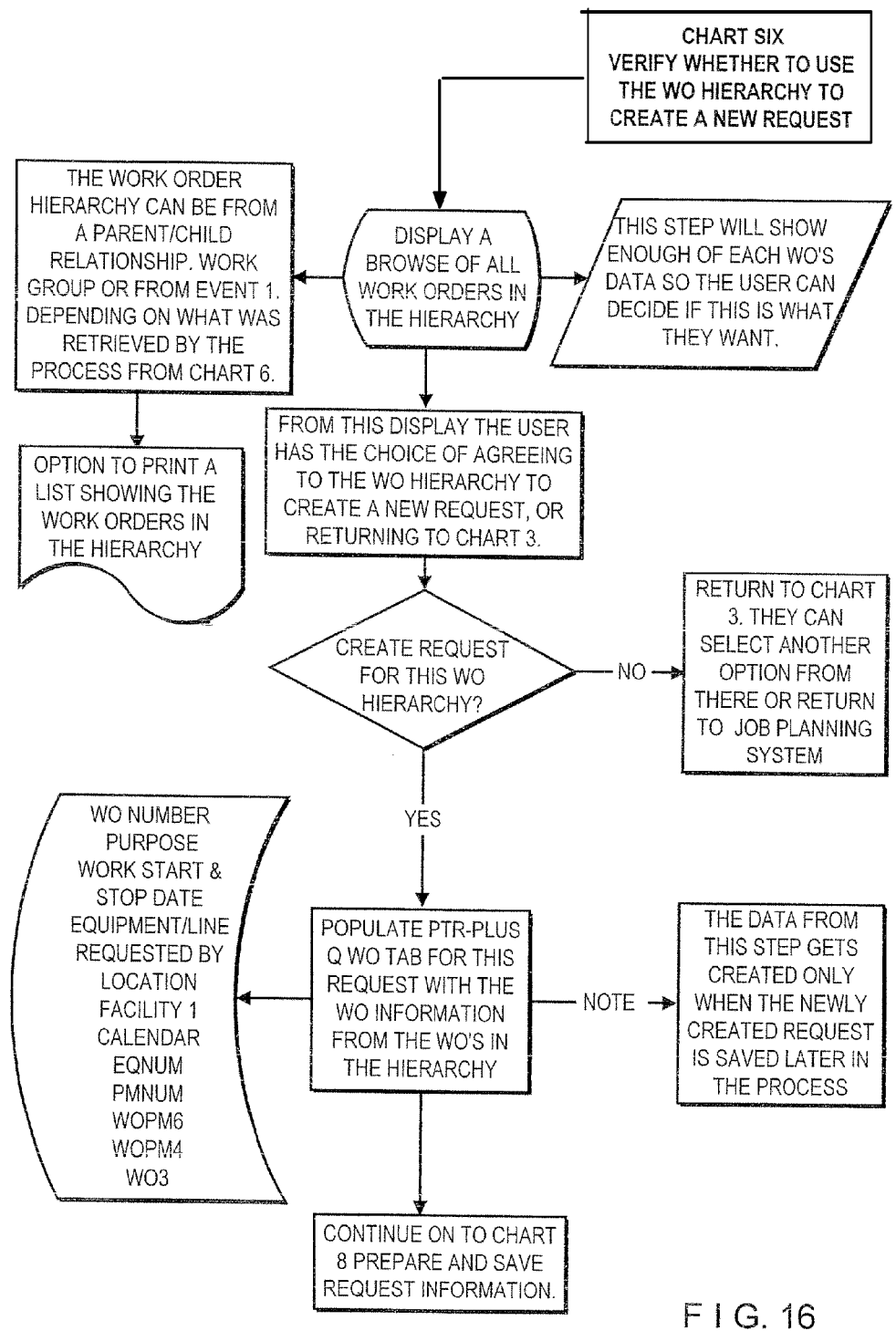
Figure 17:
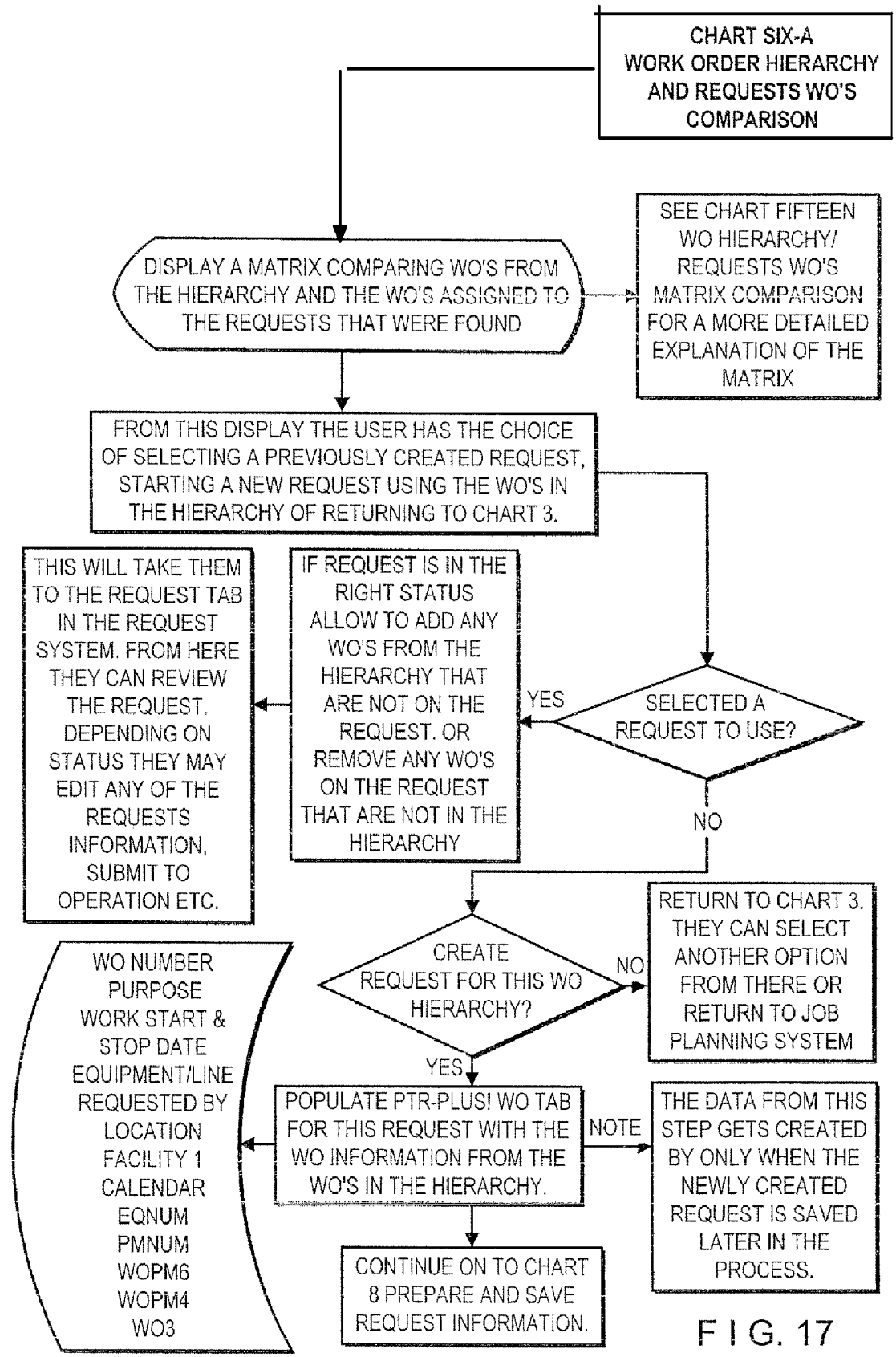
Figure 18:
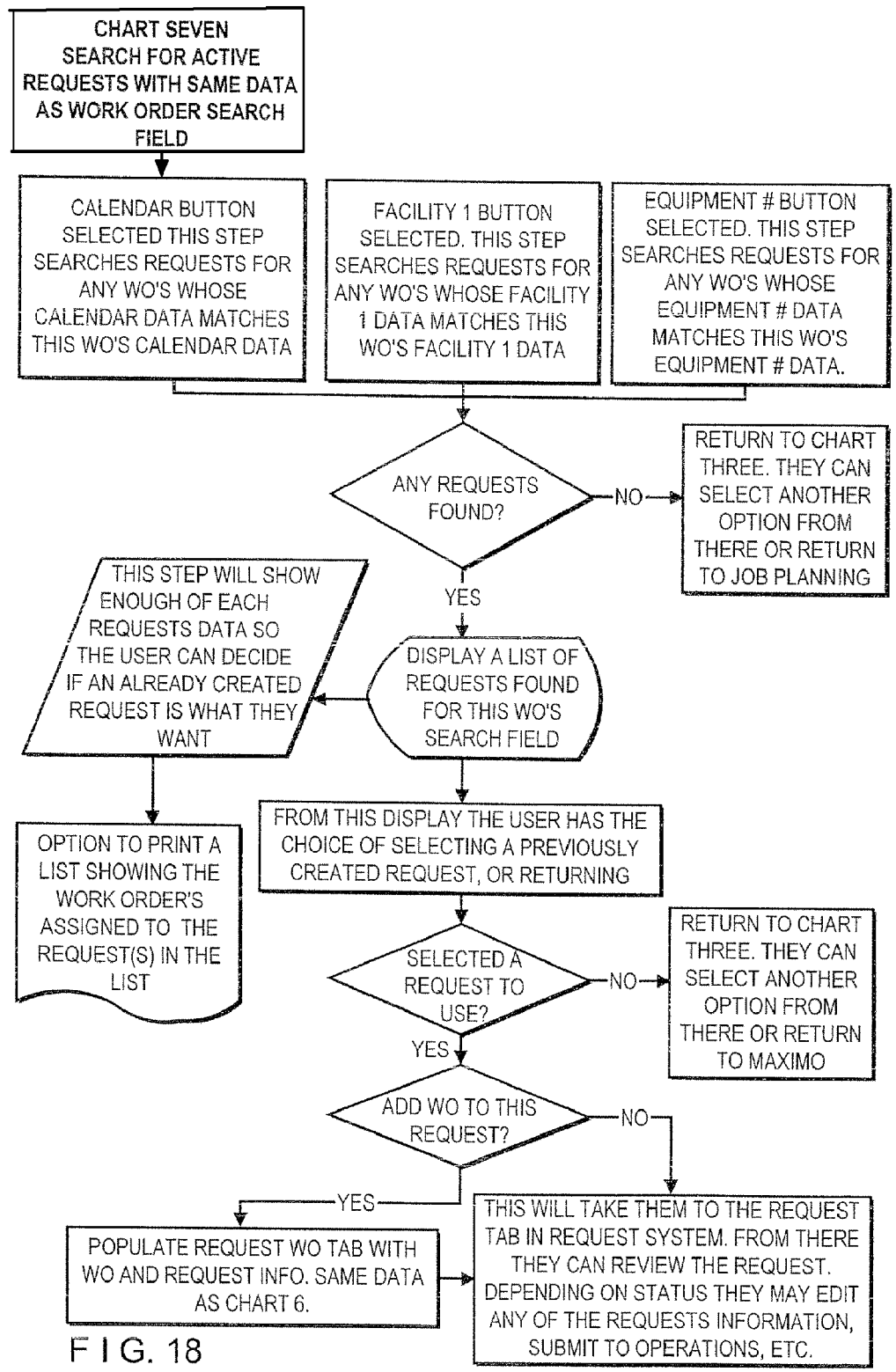
Figure 19:
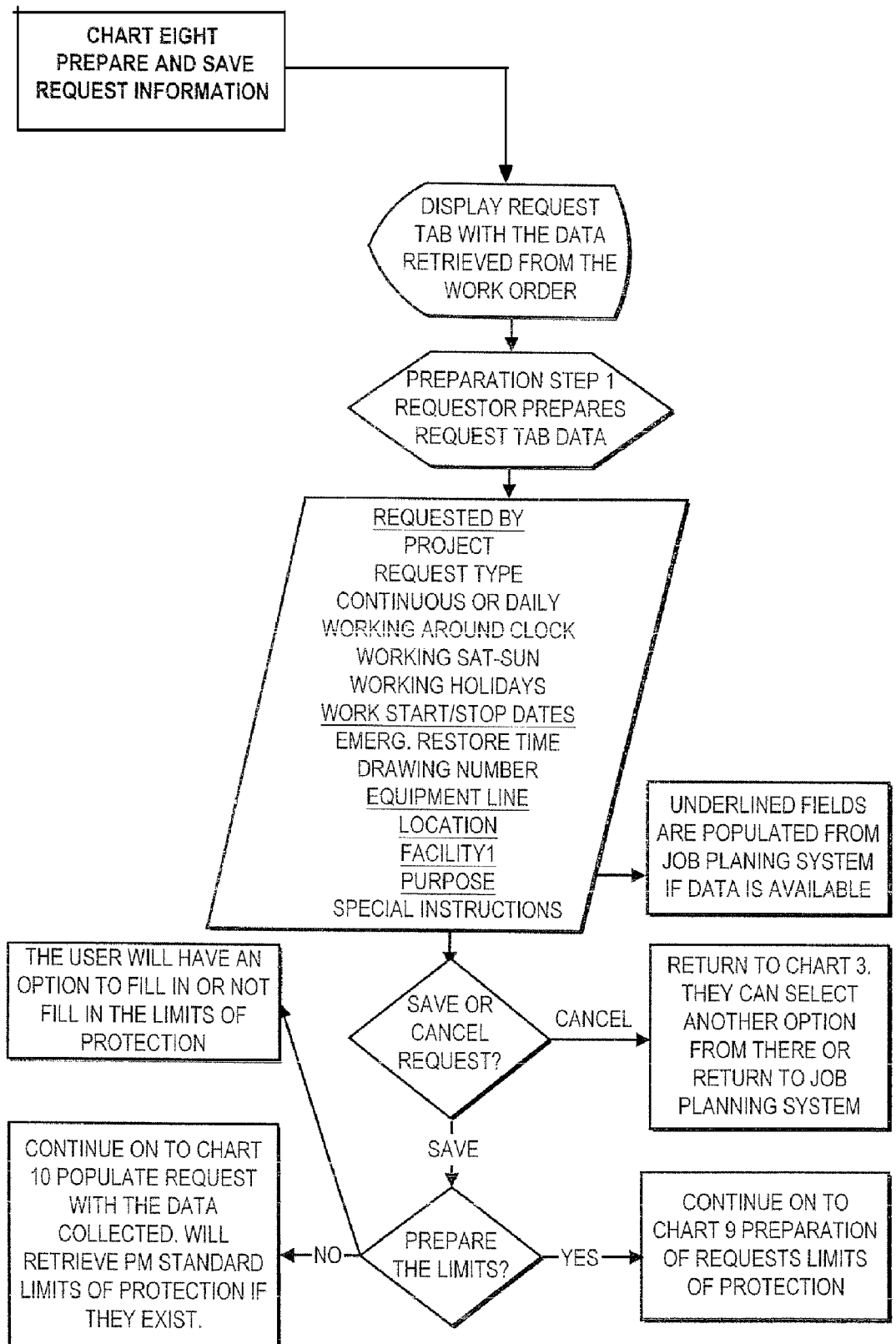
Figure 20:
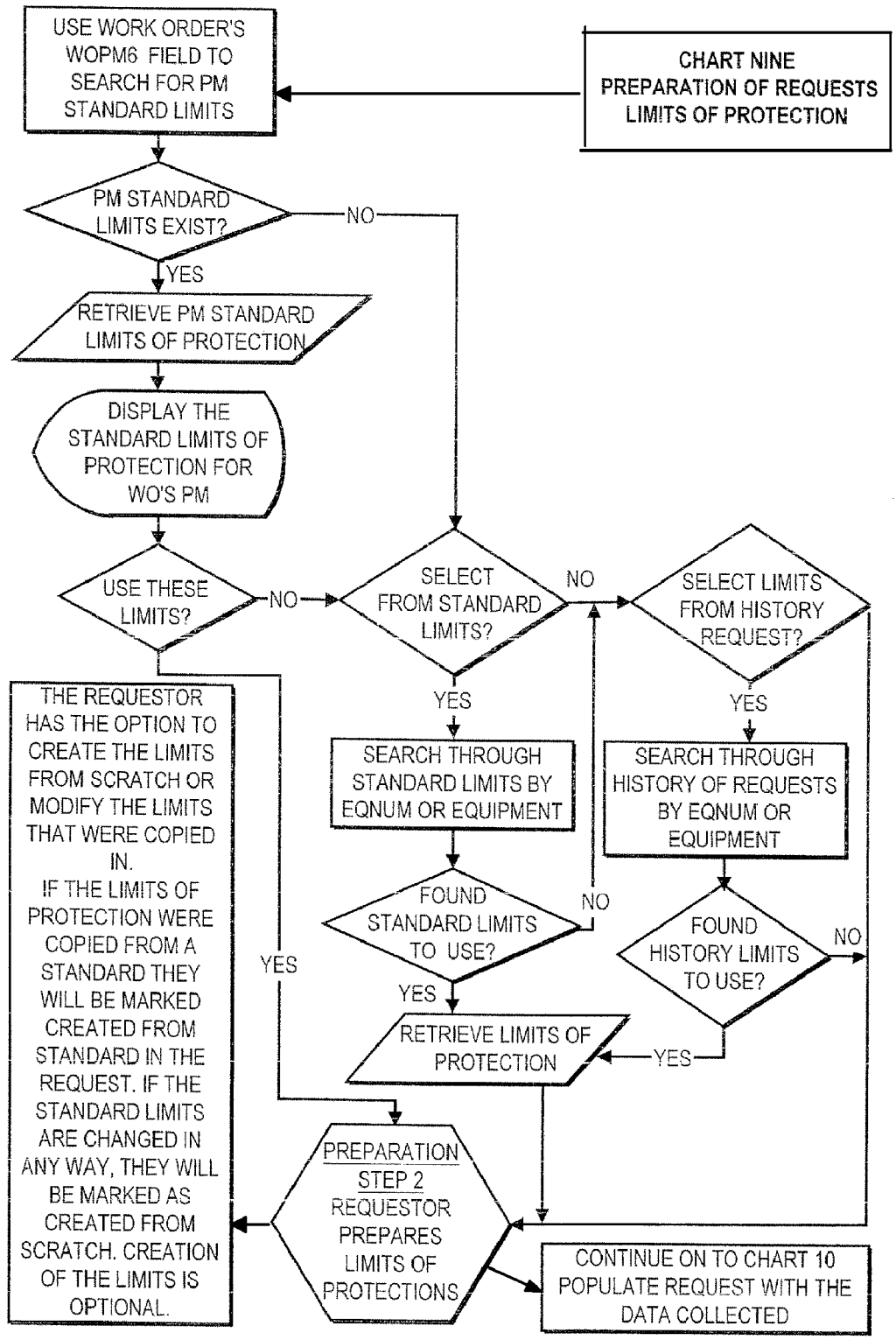
Figure 21:
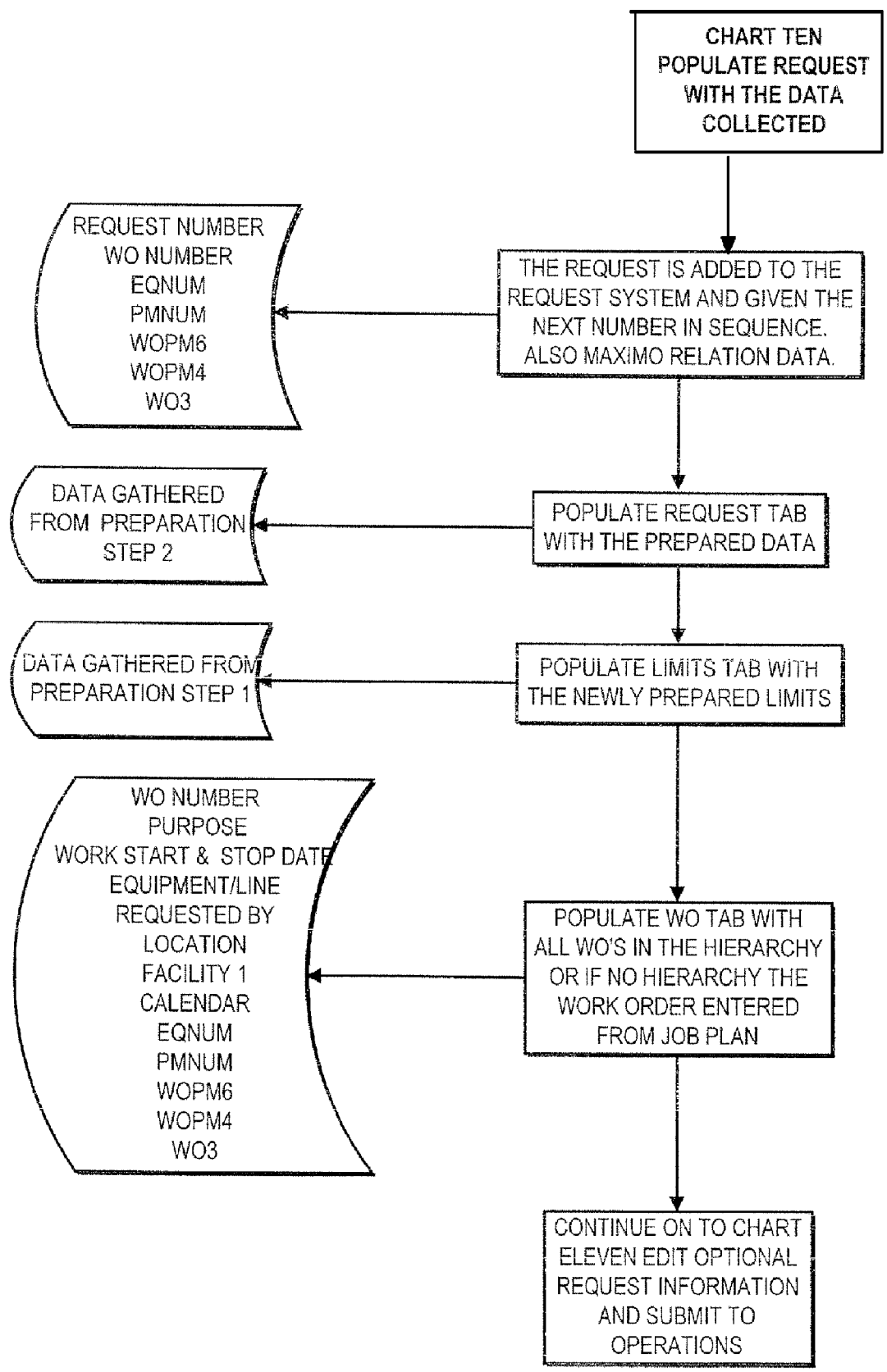
Figure 22:
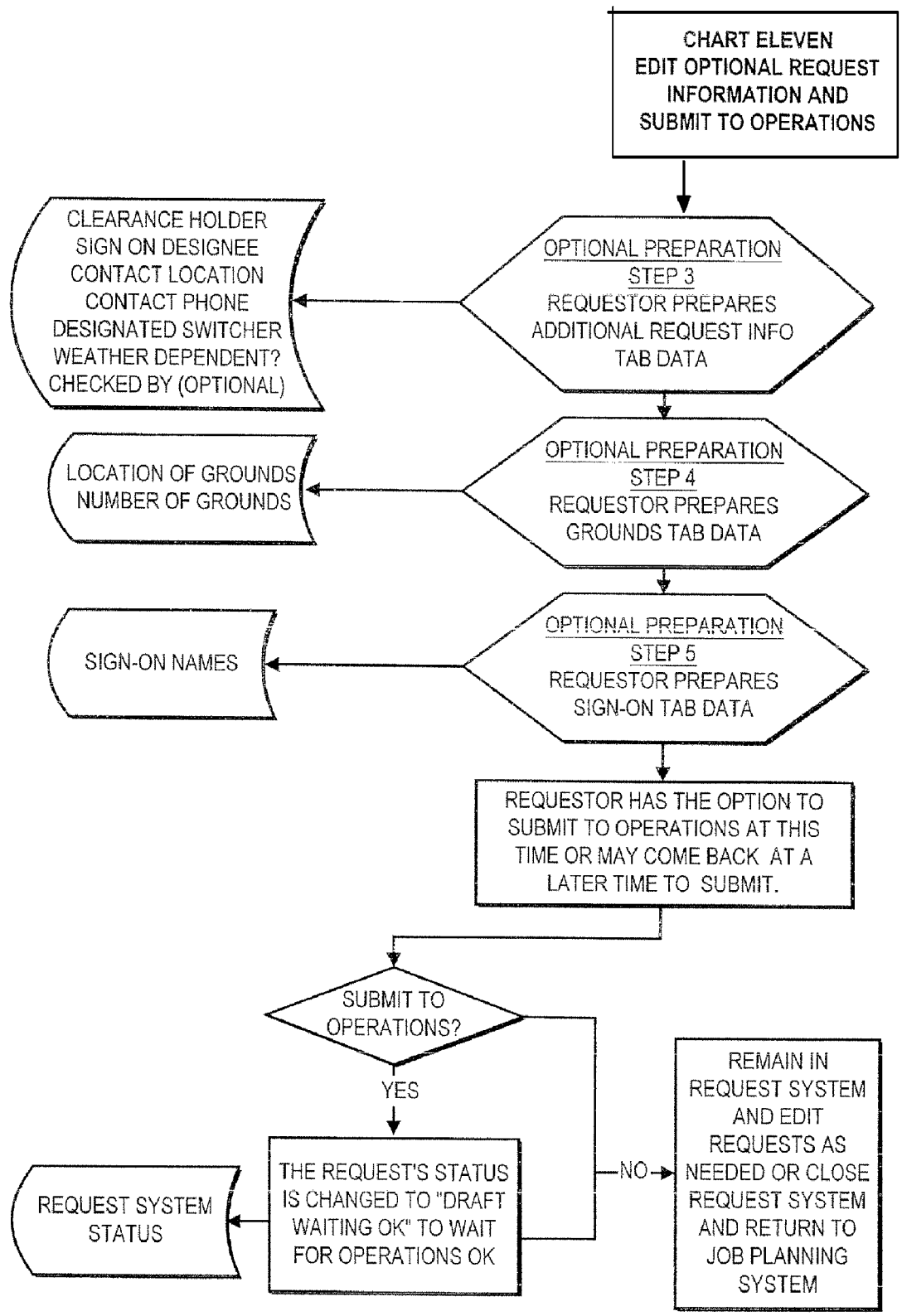
Figure 23:
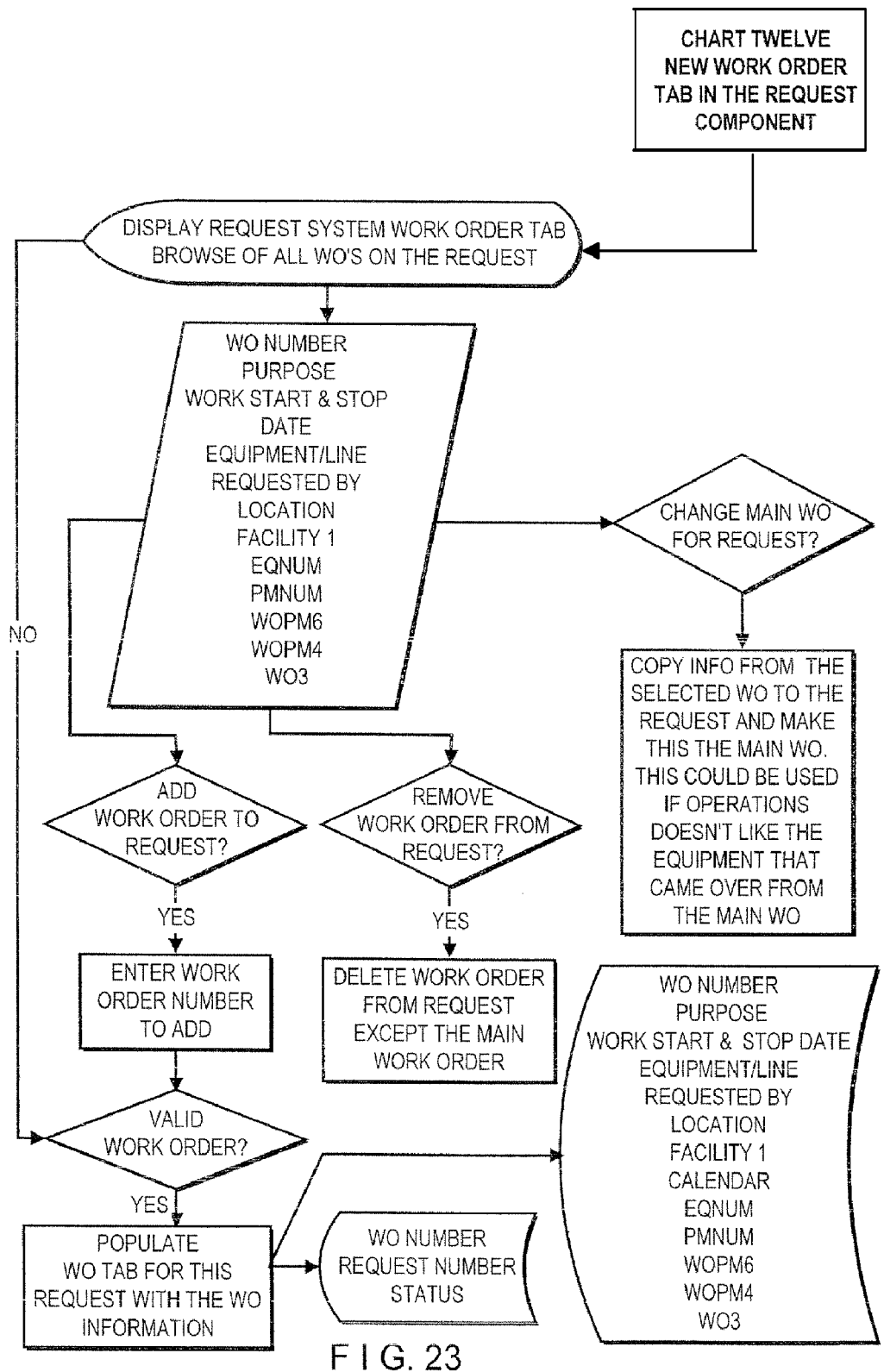
Figure 24:
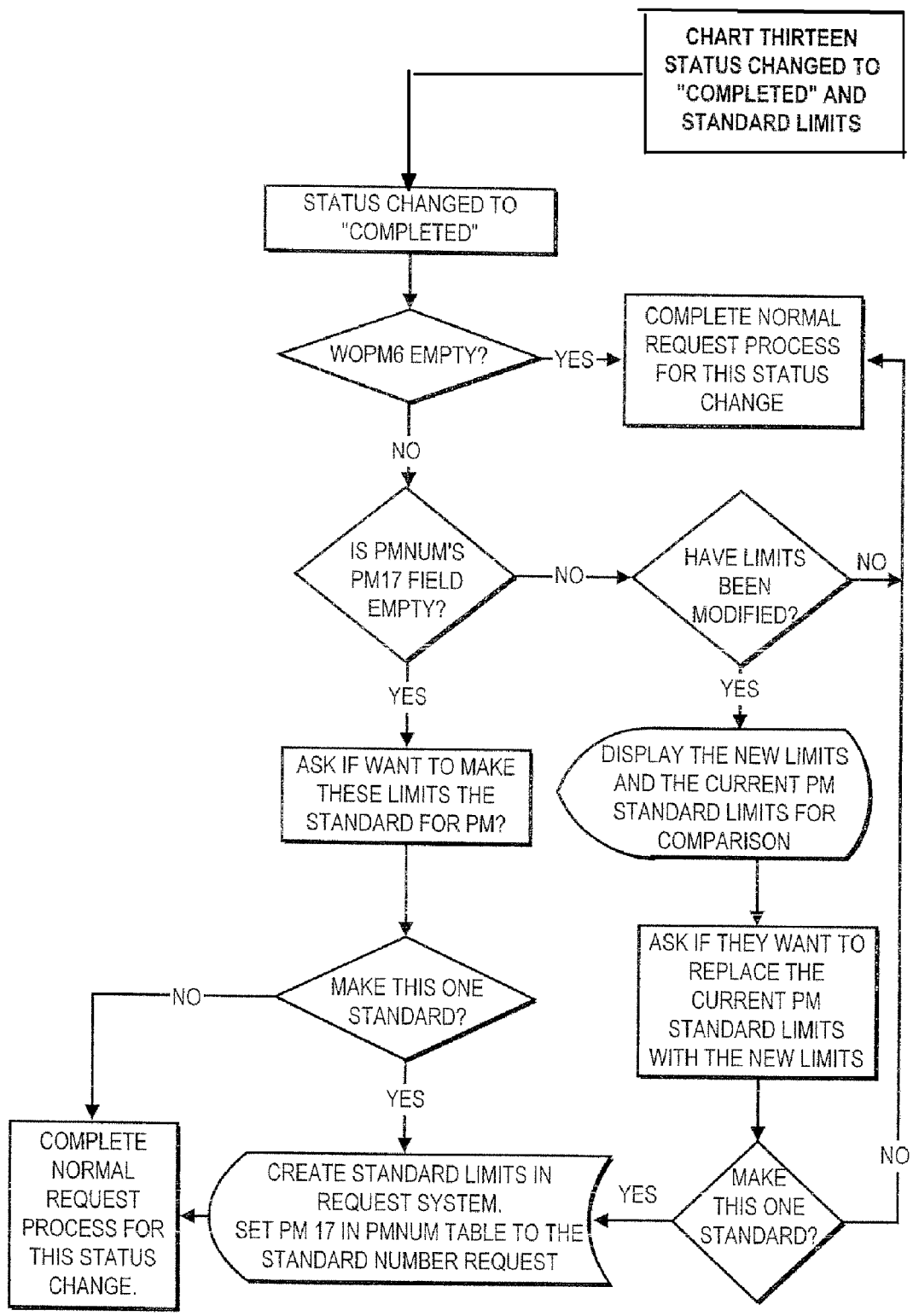
Figure 25:
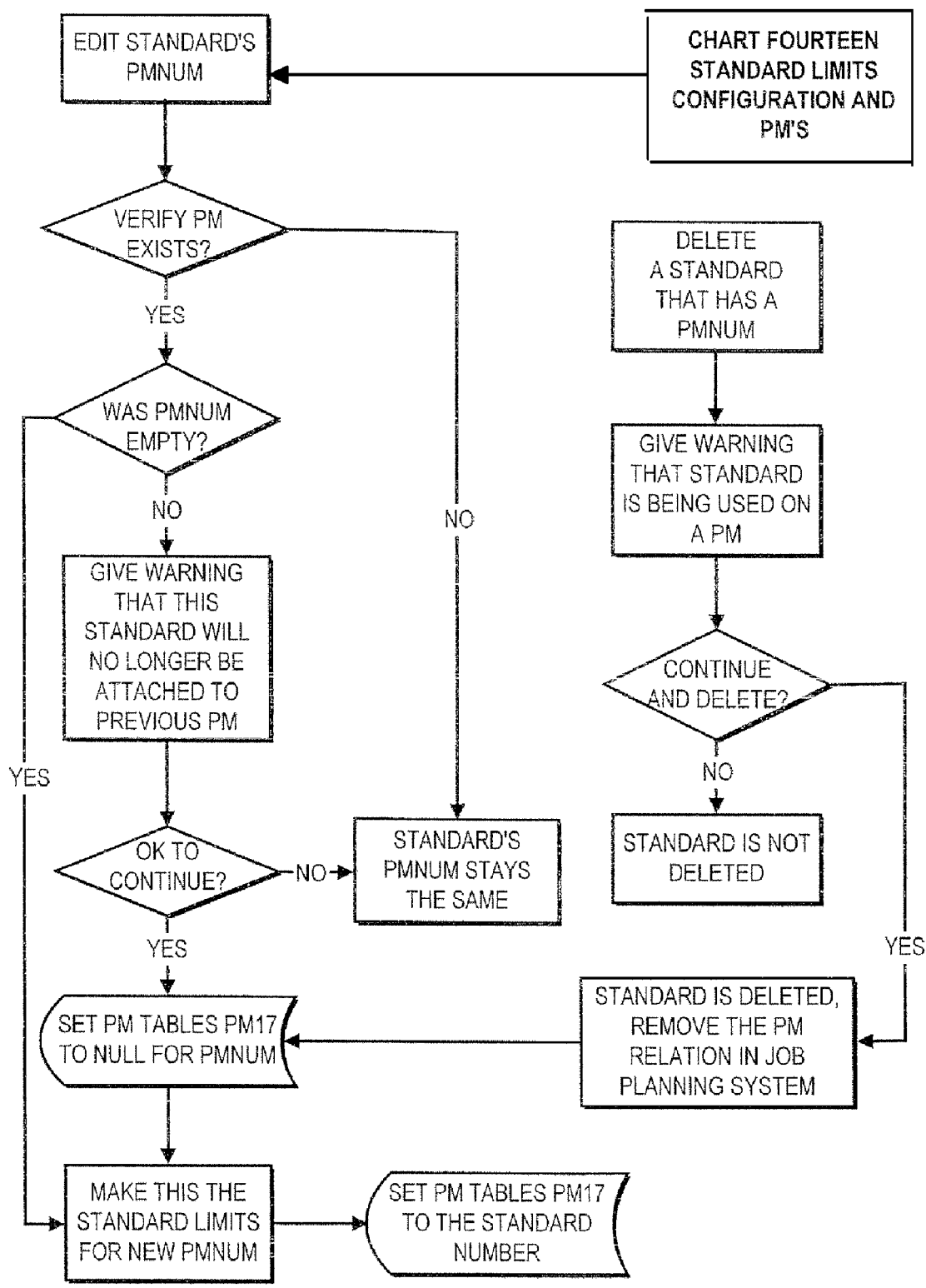
Figure 26:
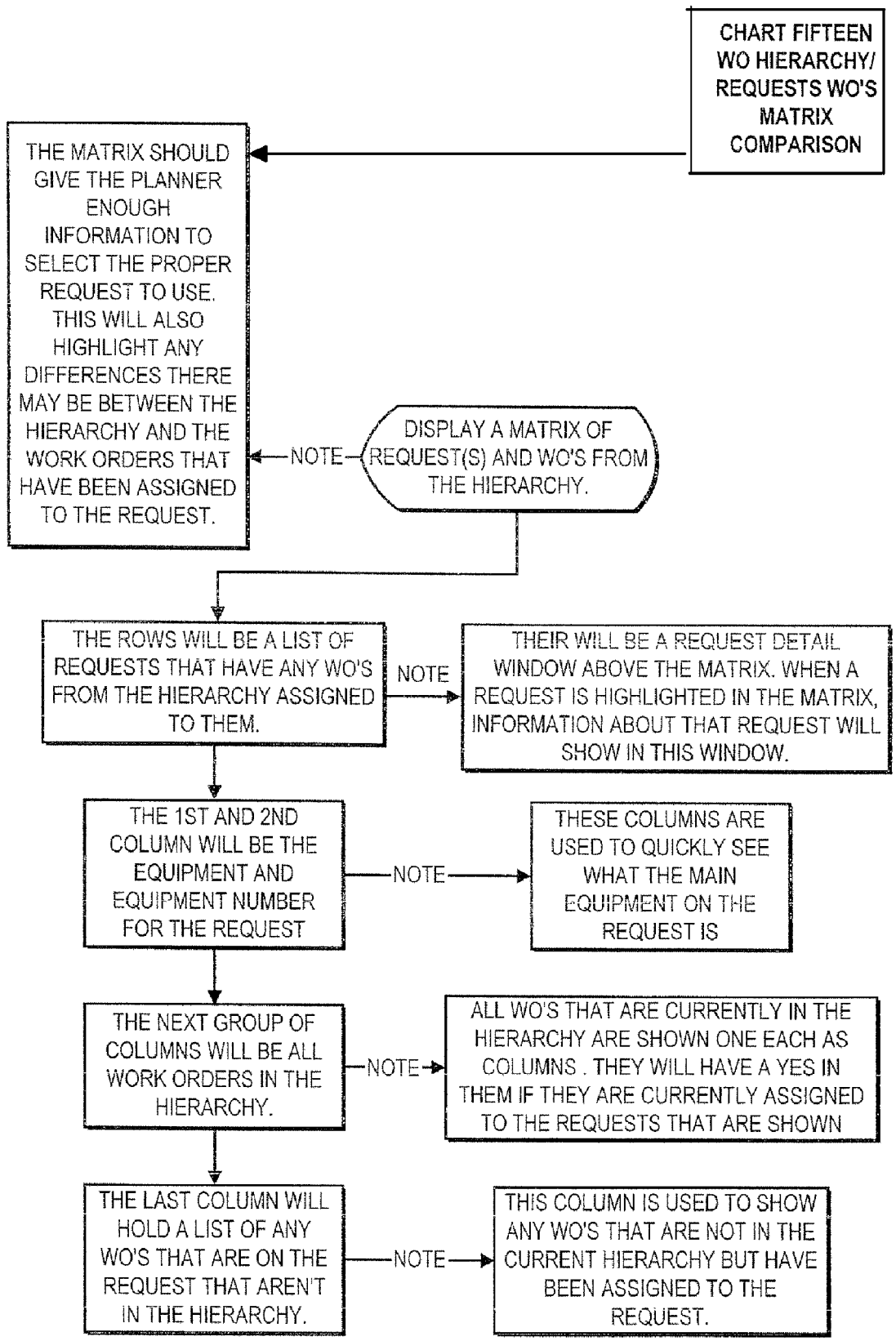

The present invention is a system which enables integration of operations requirements into job planning, work order generation, work execution and completion. The system adds instructions as well for accessing an operational requirements database, allowing a user to use accumulated information incorporated in the database to populate specific operational and/or safety requirements into corresponding fields in the job planning program and to use this information to generate a zone of protection to protect the craftsperson during commencement of the work.

In addition to a job planning interface, at least one operations interface is provided to enable operator or production management review and/or approval of the stated protection limits, and to communicate status, availability and/or approval to the job planner. The operations interface establishes the scheduled start and stop dates of the work, and provides the scheduling of the equipment's out-of-service schedule to meet system or production conditions which would otherwise cause increased loss of revenue risks. Preferably, via an internet, extranet, LAN or internet connection, multiple operator interfaces are available for input throughout the hierarchy of production, from operators in a control room to top production managers at remote headquarters locations, or to outside contractors, where contract work must be integrated into the job plan, or to regulatory bodies, such as the nuclear regulatory commission or public utility commission. Normally, such oversight is very difficult to coordinate in an efficient manner, but using the inventive system, such oversight and input is reasonably manageable, improving substantially the response time to address needed repairs, without disrupting operations planning.

Thus, operational input and requirement are fully integrated with maintenance resource allocation and planning requirements via computer interface, such that work orders only issue after the necessary approvals and operations input are archived.

In addition, the inventive system enables building a database of operational requirements for integration with a work order equipment history to allow a job planner to use the prior operations requirements for rapid preparation of a draft job plan, listing the various approvals and requirements when preparing the draft work order, which is then transmitted to the operations interface. The operations personnel can review, approve or modify the draft work order requirements to conform to current conditions. Scheduling is then coordinated between operations and maintenance so that man power utilization is optimized and the loss of revenue risks are minimized, with the additional benefit that safety is improved as use of historical standards generally assures that the correct lock-outs, safety permits and approvals are obtained prior to work commencing.

As with the integration of job standards for populating fields in the job plan, the maintenance resources system has means for populating fields for equipment clearances and operations requirements so that the planner can have the specific limits of protection recalled from the last time the work was done, and then, add modify or remove items, or simply accept those presented. Therefore, the prior manual form process, is automated and streamlined at all levels of operations' personnel.

Referring to FIG. 1, the overall system is illustrated, accessed from a computer terminal 1. The terminal 1 is listed as a job planning interface where a job planner can access a job standards program 2 or a job work order planning program 3, each associated with respective databases 4 and 5. In a preferred embodiment, an integration software program 6 allows switching between the programs to transfer data for work order generation. In either case, the user using the terminal 1 can generate work orders using one or both of these programs. In addition, the user has access to a third request software program 7 with an operations requirements database 8.

Optionally, the integration software component may enable integration with other databases, such as a tools database 9, or a materials database 10. The operations request software component may optionally communicate with a safety database 11 or equipment tagout/lockout database 12. The job planning software may also have access to a preventative maintenance database 13, or schedule database 14, so that prior data saved into these databases is available to a user in generating a job plan, a work order or an operations order. Further, the software program may have additional user configurable interfaces, for example a management interface terminal 15 to obtain off-site management approval of the job plan and/or work orders, a contractor interface terminal 16 for coordinating contract work schedules and clearances with maintenance scheduling and planning, and even a regulatory interface terminal 17 for notice and approval by a regulatory body where necessary or desirable. The higher the level of interaction, the more coordinated is the work effort, promoting an optimized environment for work to proceed.

For this application, a "request" means a request for service which typically necessitates the removal of equipment from service in a de-energized, depressurized, or similar process isolated condition to enable a craftsperson to safely perform his/her assigned work order task. In essence, a requester is seeking to have a work order generated to address their specific need. The requester may be an operator, supervisor, or a job planner setting up, for example, to safely perform preventive maintenance. The requester normally includes in the request specific details, limitations or requirements that must be met to execute the work order.

The term "terminal" is used to designate a man/machine interface where a user has access to and can interact with the computer based software system. This may include desktop computers, laptop computers, as well as wireless devices having for example internet access capabilities.

The database 8 associated with the request software program 7 preferably contains two components, standard requirements (also referred to as "limits of protection") and historical requests, that is, an up to date history of all prior requests, with details related to the requests both components being searchable by facility, equipment number or other identification (i.e., all requests related to PMP23 (pump 23)) or work order number. Of course, other criteria can be used and this list is merely illustrative and in no way limits the scope of the present invention.

The term "clearance" means a document which defines the condition or state of the equipment has to be in when made available for maintenance. The clearance is one of many types of protections the operations department can provide, for example to identify that it is "OK to Work", or Special Conditions.

A user may search the database for any existing clearances that offer the limits of protection in the area of in progress planned work such that the user can "sign on" to the existing clearance allowing the craftsperson to start his/her work by performing the work during the peiod covered by another clearance, to in essence "piggy-back" on someone else's clearance. For example, limits of protection for a particular pump may make available an associated filter so that while work is ongoing on the pump, work can safely proceed on the filter as well. This prevents a common scheduling problem where equipment is taken off-line for service one day and then taking the same related equipment out of service the next day or next week for preventitive maintenance.

Figure 27:
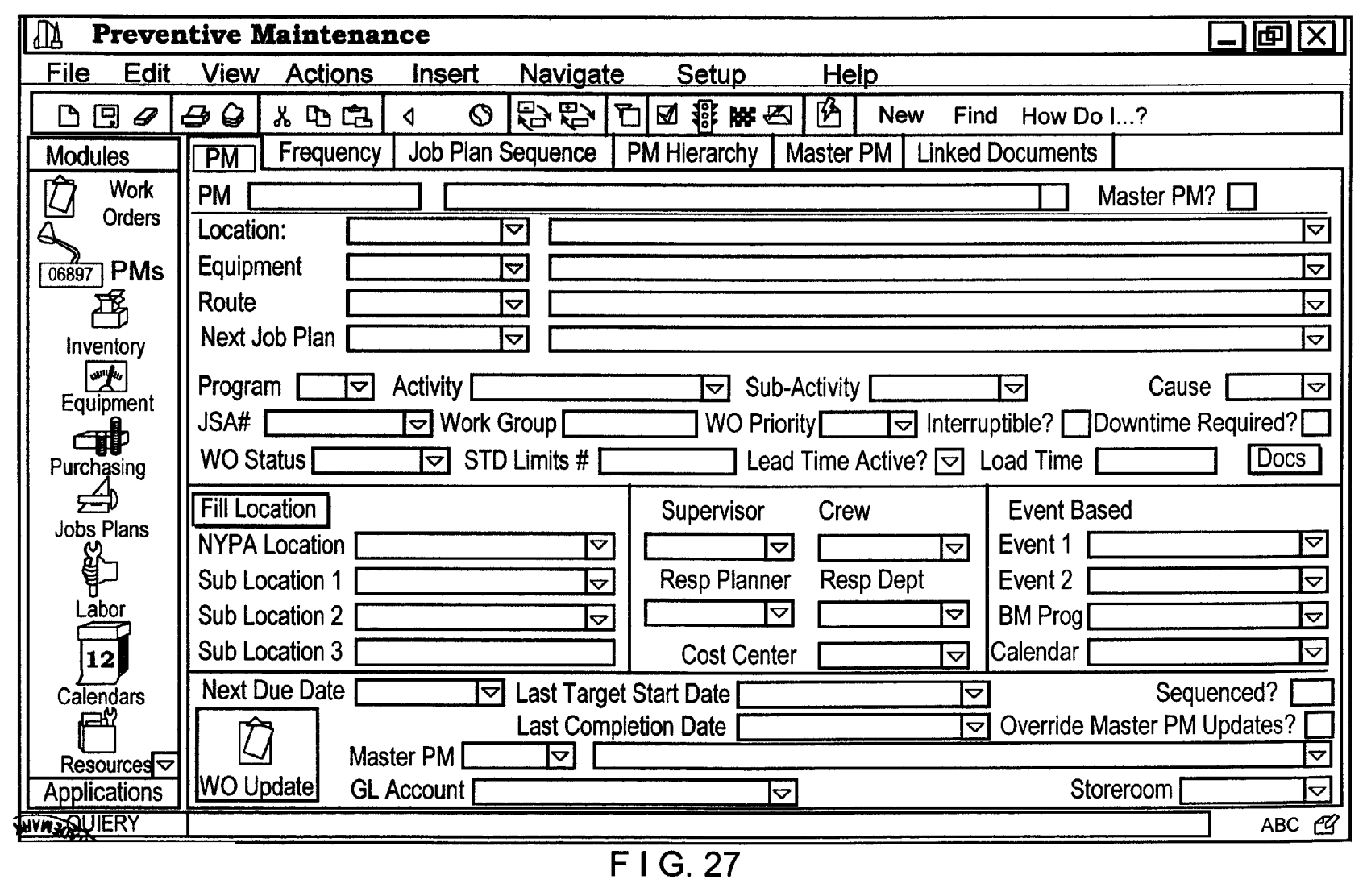

There is also a benefit to using preventive maintenance (PM) standard clearances. The PM clearances previously used and saved by operations become a standard for that proceedure and equipment. The clearance routine is assigned a unique number associated with the unique PM. Therefore each time the PM is used to generate a work order, the program will "read" the "std limit #" (See FIG. 27) and automatically ask the user "do you want to use the standard clearance for the PM work order?" If yes, the request is completely filled in with all previously used protection for the equipment covered by the unique PM.

The following describes the system operation in more detail.

1.0 Using a Work Order to Activate the Request System

The request software is preferably selected through the integration software component using a button on the Work Order tracking display, such as shown in FIG. 2, which can be activated by a mouse click or other means, the button acting as a switch which, when activated, causes a request logic tree to be executed. The logic tree manages operating orders, switching orders, tags, etc. The file containing the logic tree may be located in a system directory on either a local computer, a server, or on any computer connectable via intranet, internet or local area network.

A work order number is the only required information that need be designated and passed from the work order system to the operations integration request system ("OIS") which uses the work order number to update the work order tables and search for an active request or create a new request. A typical user interface display is shown in FIG. 3. If a requester tries to activate the request system without a work order number, the request system will not be started. The message "Cannot start Request system without a selected work order number" will be displayed in the work order system display.

With a designated work order number passed to the OIS, the OIS will search, when selected, for the existence of the work order in the first database, though various searches can be undertaken, by event, work group, calander, facility, equipment number, in any associated databases. The OIS is then activated and will use the following criteria to determine the parent work order number and its children. (Generally, several work orders may be required, directed to different trades or to different equipment to be serviced at the same time, and so a main work order may cover the overall project, i.e. "the parent", and the various individual derivative work orders to complete individual tasks related to that project are "the children" work orders.):

1. Search WORK ORDER table by Work Order number:
2. If the Work Order status is not waiting to close, or completed, it will retrieve all work orders in the work order hierarchy that are associated with the Work Order Number that is passed to OIS, and, retrieve the SAME Event, Calendar, Equipment Number, and others associated with the Work Order Number passed to OIS. The retrieved fields are used by the user to group related work order numbers on the same request, to piggy-back onto the existing request, and develop various levels of protections so that as the work is completed, for example, on a major overhaul, the outer level of protection may be released as the equipment is progressively returned to service to increase revenues, the remaining levels of protection are each released in an ordered fashion to allow the work to proceed uninterrupted in an organized manner with the minimum disruption of production.

For a selected Work Order, the system will search the work order table by designated and passed Work Order Number(s) to retrieve data in the following illustrative fields: work order number, description, scheduled start, scheduled finish, equipment number, W08, leadcraft, location, WOEQ9, WOEQ 13, WOEQ 14, estimated duration, WOEQ5, W03, preventive maintenance number, master work order number, WOPM6. For selected Work Order, a search can be undertaken of the equipment table by retrieved equipment number, and retrieve data in the description field.

The OIS request (see FIG. 3) preferably has several pushbuttons such as : AGREE, SAVE, REVISE, CREATE NEW REQUEST, RETURN, PRINT LIST [of requests], SELECT REQUEST, and CLONE REQUEST.

If the designated and passed Work Order Number does not have any children, sub work orders, or associated work orders, the passed work order is the parent work order, and then the OIS request is completed with the Work Order Number passed from the work order system to OIS and the result set from the search of the WORKORDER and EQUIPMENT tables.

If more than one work order is found, the Work Order Number designated and passed initially from the work order system to the OIS system searches for selected Work Orders, through a search of the EQUIPMENT table by retrieved Equipment number, and data is retrieved from the equipment DESCRIPTION field. Otherwise, the user selects "CREATE NEW REQUEST" and begins.

The third software program provides the user with access to operations standards and protection requirements preferably organized for ease of retrieval of relevant standards known as limits of protection. The limits of protection provide specific types of protection which are called: clearances, special conditions, OK to work, guarantee, in-service maintenance among others. Limits of protection may include but are not limited to equipment tag required, lockouts required, specifics of safety permits needed, contact information for obtaining clearances. The limits of protection define among others, the development of operating orders, switching orders, ground required and tags required to be located on specific equipment and approved level required.

The limits of protection define, among others, the development of operating orders, the development of operating orders, switching orders, ground required, and tags required to be located on specific equipment and approval level required.

Referring to FIG. 2, a typical work order search display is shown through which the integration software allows searching of the first, second or third databases. In this case, the third database system may be based on a product known as "PTR-PLUS! (the "Request" system) which stands for "Protective Tagging Record", obtained from Software Sense System, Inc.

The result set(s) from the search of the WORKORDER and EQUIPMENT tables will be one of two scenarios:

If one Work Order number is found, the designated and passed Work Order Number does not have any children, sub work orders, or associated work orders, then the passed work order is the parent work order. Then, the request is completed with the Work Order Number passed from the work order system to PTR PLUS! and the result set from the search of the WORKORDER and EQUIPMENT tables.

If more than one Work Order is found, the Work Order Number designated and passed initially from the work order system to PTR-Plus! may or may not be the PARENT Work Order. The search of the WORK ORDER table is not completed until all children, sub work orders or associated work orders are found. The search will determine the Work Order hierarchy and the parent and children relationship association with the designated and passed Work Order Number to PTR-Plus!. The result set of the search, illustrated in FIG. 10, may display as follows:

The message "Do you wish to request an OPERATING ORDER for the following:
PARENT WORK ORDER NUMBER AND DESCRIPTION: (result)"
ALL CHILDREN WORK ORDER NUMBERS AND DESCRIPTIONS: (result(s))"

If the requestor accepts the request, he will push the "AGREE" pushbutton. The OIS REQUEST is completed for the PARENT WORK ORDER NUMBER and DESCRIPTION and the CHILDREN WORK ORDER NUMBER(S) and DESCRIPTION(S) determinated from the OIS search, which will cause the following:

The PARENT WORK ORDER NUMBER and DESCRIPTION and its result set retrieved from the WORK ORDER and EQUIPMENT tables are populated in the REQUEST. The parent Work Order Number and descriptions will be assigned to the Operating Order.

The Work Order Number and Description for each of the CHILDREN WORK ORDERS are populated in the REQUEST. No additional search result set is populated for the CHILDREN WORK ORDERS. The Work Order Number and Description for each of the children work orders are provided in the OIS Request for confirmation and informational purposes for the requestor.

If the REQUESTOR wishes to ADD, DELETE, MODIFY or SUBSTITUTE any PARENT or CHILDREN WORK ORDER NUMBERS and DESCRIPTIONS in the OIS search result set, he will receive the message window that states "Do you wish to request a OPERATING ORDER for the following" (see FIG. 7):

When user adds a work order number, OIS will check the work order (MAX IMO) database to verify the work order number exists and correct status. If the work order number does not exist, the program will not add the work order number in list and select "delete" button;

To delete, highlight the work order number on the list and select the "delete" button;

Or user can select "copy this work orders' equipment/purpose to request and the request (see FIG. 9) is replaced with the highlighted work order number on the list.

The REQUESTOR will be asked "do you wish to request an operating order for the following"?
PARENT WORK ORDER NUMBER AND DESCRIPTION: (result set)
ALL CHILDREN WORK ORDERS NUMBERS AND DESCRIPTIONS: (result set)"

The Requestor will push the "revise" button and OIS will search for the existence of a REVISED PARENT and CHILDREN.

The REQUESTOR may push the "Return to MAXIMO" pushbutton and return to the work order system, at which point, the request system is deactivated.

In the work order database, OIS will access some of the information dealing with Work Orders. Following is an illustrative list of the tables and the specific fields that OIS may retrieve or update though the particular ones may vary from user to user:

|  | Name | Size | Remarks |
| --- | --- | --- | --- |
| WORKORDER | WONUM | 10 | Work Order Number |
|  | DESCRIPTION | 50 | Work Order description |
|  | SCHEDSTART | 10 | Schedule Start date |
|  | SCHEDFINISH | 10 | Schedule Finish date |
|  | EQNUM | 8 | Equipment Number |
|  | WO8 | 4 | Planner/Requestor |
|  | LEADCRAFT | 18 | Lead Craft |
|  | LOCATION | 25 | Equipment Location |
|  | WOEQ9 | 25 | Equipment-Sublocation 1 |
|  | WOEQ13 | 25 | Equipment-Sublocation 2 |
|  | WOEQ14 | 25 | Equipment-Sublocation 3 |
|  | ESTDUR | 8 | Estimated Work Order Duration |
|  | WOEQ5 | 16 | Equipment-Facility 1 |
|  | WO3 | 20 | Event 1 |
|  | PMNUM | 8 | Preventative Maintenance Number |
|  | MASTERWONUM | 10 | Master Work Order Number |
|  | DESCRIPTION | 50 | Work Order Description |
|  | WOPM6 |  | Standard Library Request Number |
|  | Status | 8 | Work Order Status |

-continued

|  | Name | Size | Remarks |
|---|---|---|---|
|  | Has children | 1 | Yes, Has Child, No, No Child |
|  | Parent | 10 | Master Work Order Number |
| EQUIPMENT | DESCRIPTION | 50 | Equipment Short Description |
|  | EQNUM | 8 | Equipment Number |
| PM | PM17 | 8 | Standard Library Request Number |
| OPERATING ORDER | WONUM | 10 | WORK ORDER NAME |
|  | DESCRIPTION | 50 | WORK ORDER DESCRIPTION |
|  | EQNUM | 8 | EQUIPMENT NAME |
|  | DESCRIPTION | 50 | EQUIPMENT DESCRIPTION |
|  |  |  | DATE REQUEST SUBMITTED |
|  |  |  | REQUEST NUMBER |
|  |  |  | TYPE |
|  |  |  | DATE REQUEST APPROVED |
|  |  |  | ORDER NUMBER |

The following translation table may be used by the OIS to copy, insert and populate the following fields from the work order table into the request tables to execute the work order request integration:

| W.O. TABLE | W.O. NAME | SIZE | REQUEST |
|---|---|---|---|
| WORKORDER | WONUM | 10 | WORK ORDER NUMBER |
| WORKORDER | DESCRIPTION | 50 | PURPOSE |
| WORKORDER | SCHEDSTART | 10 | WORK START DATE |
| WORKORDER | SCHEDFINISH | 10 | WORK STOP DATE |
| WORKORDER | EQNUM | 8 | EQUIPMENT NUMBER |
| EQUIPMENT | DESCRIPTION | 50 | EQUIPMENT/LINE |
| WORKORDER | WO8 | 4 | REQUESTER |
| WORKORDER | LEADCRAFT | 18 | LEAD CRAFT |
| WORKORDER | LOCATION | 25 | LOCATION |
| WORKORDER | WOEQ9 | 25 | SUBLOCATION 1 |
| WORKORDER | WOEQ13 | 25 | SUBLOCATION 2 |
| WORKORDER | WOEQ14 | 25 | SUBLOCATION 3 |
| WORKORDER | ESTDUR | 8 | DURATION (HR:MIN) |
| WORKORDER | WOEQ5 | 16 | FACILITY 1 |
| WORKORDER | WO3 | 20 | EVENT 1 |
| PM | PMNUM | 8 | PREVENTIVE MAINTENANCE NUMBER |
| WORKORDER | PARENT | 10 | Master Work Order Number |
| PM | PM17 |  | Standard Library Request Number |
| OPERATING ORDER |  |  | DATE REQUEST SUBMITTED |
| OPERATING ORDER |  |  | REQUEST NUMBER |
| OPERATING ORDER |  |  | TYPE |
| OPERATING ORDER |  |  | DATE REQUEST APPROVED |

For this application, a "standard operating order" means a previously approved operating order that ordered the required equipment removed from service in a manner that provided a safe, working environment to conduct and compete a specific maintenance task. Therefore operations choose to make the operating order a "standard" which would be available for future use. This feature is one of many significant cost saving that is provided by OIS.

2.0 Create Request

A. From an Existing Standard

In this section, the requestor is allowed to complete the Operating Order REQUEST with the use of a previously approved Operating Order that has been archived in the Standard Library database, called a STANDARD or use of a previously completed operating order that has been archived in the completed or history folder.

The Standard Table will have an EQUIPMENT column associated with each library standard archived. The system will search for a Standard Library Request Number, retrieve and view the associated Standard Operating Order, query the requestor if he or she would like to modify the retrieved standard. Any modifications to the standard will not be used to overwrite the saved and archived (retrieved) standard. If the requestor would not like to use the standard, the requester may manually complete the request. (If the requester wishes to modify the retrieved standard, a new operating order request is required, and this will be discussed later.)

Assuming the requester does not wish to modify the retrieved standard, then the passed WORK ORDER NUMBER does have a STANDARD in the STANDARD Table. The system will retrieve the standard that is referenced by the Standard Library Request Number. The REQUESTOR will review the standard. If the REQUESTOR agrees with all data, the REQUESTOR will click on the AGREE/SAVE button. All data will be copied automatically to the request screen.

The REQUEST SCREEN will appear without any additional keystrokes. All fields associate with the standard will be populated.

The REQUESTOR will complete the remaining request fields, including: type (clearance, etc.), request days (Daily or continuous); working around the clock, working Sat-Sun, working holidays; emergency restoration time, special instructions, and limits of protection, if not completed from a standard. The requester would then click on the SUBMIT/DRAFT WAITING OK button to submit the request to operations, as will be discussed below. (Preferably, on the face of the button, the next status is seen. When the button is pushed, the request becomes the status shown on the button.)

Alternatively, the REQUESTOR may review the standard and pick and choose, by highlighting the selected field, the data fields to be COPIED to populate the REQUEST SCREEN, and then push the AGREE button and the SELECTED data will copy automatically to the corresponding fields in the REQUEST SCREEN. The REQUEST SCREEN will appear without any additional keystrokes. The selected fields associated with the standard will be populated, and the REQUESTOR will manually complete the remaining request fields. However, the field "limits of protection created from" will be changed from "standard" to "scratch" (See FIG. 5). Therefore, the request approval process is flagged and operations will provide a more detailed review.

B. New Requests

This section covers New Operating Order Requests that are not in the Standard Table. The REQUESTOR will complete all request fields that are not available in the work order system, including: type (clearance, etc), requested days (Daily or continuous); working around the clock, working Sat-Sun, working holidays; emergency restoration time, special instructions, and limits of protection. The balance of the fields are completed manually as necessary. As before, the system will determine if the Standard Library Request Number is NULL, in the designated and passed Work Order. If not, the sequence will proceed as described above. If NULL, the designated and passed WORK ORDER NUMBER does NOT have a STANDARD that was archived from a previously APPROVED work order in the STANDARD LIBRARY. The requestor will then be queried: "A Standard does not exist. Do you wish to review, in overview, all similar standards associated with the Equipment description specified in the designated and passed Work Order Number_____?" Five buttons will preferably be provided, "Select Device", "Select limits from standards by EQNUM", "select limits from history requests by equipment/line", "select limits from history request by EQNUM." and "select limits from standards by equipment line" (see FIG. 5). If a pushbutton is pushed, the request system will OPEN STANDARD LIBRARY to select and view all standards for the equipment name or number in the designated and passed work order. (The Standard Libarary table will have an EQUIPMENT and EQNUM column associated with each standard). The Requestor will select a standard and highlight all data fields to be used to populate the REQUEST SCREEN or select the entire standard without highlight.

Upon standard limits selection, the requestor returns to the request screen. The Requester can view one or all standards and select the standard and push "COPY LIMITS OF PROTECTION" (see FIG. 6). The highlighted fields or the entire standard will be copied and populate into the request screen. All fields associated with the highlighted standards or the entire standard as previously selected by the requestor will be populated. The REQUESTOR will complete any remaining request fields manually, including the responsible party who will take responsibility of the "limits of protection" that was provided by operations by means of the equipment taken out of service, and activate the SUBMIT/DRAFT waiting OK button to send to operations. During the progress of the maintenance task, another craftsperson can start or stop work under the same "limits of protection". (piggy-back concept). Pushbuttons to "add" and "delete" are provided on an associated screen to enable additions and subtractions. It should be noted that security is provided in programing the limits as to who is responsible for the clearance, who can approve or disprove a requested clearance, who can modify, or cancel a clearance or request.

If the Requestor clicks on the Create New Request button, the REQUEST SCREEN will appear without any additional keystrokes. The REQUESTOR will manually complete the REQUEST SCREEN, and then submit to operations.

The requestor has the benefit of planning future maintenance work and requesting clearance/operating orders but allow the request to remain "draft" without the necessity to "submit to operation" at the time of request initialization. The requester can "save" the request and the program will assign "draft" as its status. Until such time that the requester has completed the planning effort, the operating order remains in status "draft" and upon "submit to operations" the status in upgraded to "draft waiting ok".

This process benefits the up front planning to maximum productivity to provide sustained reduced maintenance costs.

This process further provides planning with up front operations feedback as to whether the planned maintenance task can be performed at the requested "work start date" and "work stop date". In other words, the system allows an initial interrogation with operations to determine if the specific equipment can be removed from service without a degradation in system reliability or operating revenue reduction.

3.0 Submit Request to Operations

The REQUESTOR having completed the required fields and reviewed carefully the completed REQUEST, being satisfied that the request is competed with the most current draft waiting ok information of the planned work, will then click on the SUBMIT TO OPERATIONS/DRAFT WAITING OK button and the following will occur:

A Notification message may be submitted to Operations, along with the request, to alert Operations that a request has been submitted for their review and approval. The request number assigned to the submitted request may be returned to the requestor along with a message: "Operating Order Request Number_____ was requested for: (Work Order Number) (Work Order Description) (Equipment Number) (Equipment Description), etc. The Operating Order may have the following Work Orders assigned to Operating Order Request Number_____:

Based upon Parent/Child field or event field, or calendar field, or work group field or equipment number field, or facility field, i.e. the field the requester choose to create the request.

A message window is displayed that states the request status has been changed to "draft waiting ok", yes or no. Once the YES pushbutton is pushed, this CLOSES the message window, and the OPERATING ORDER table is populated by the request system. The date the request was submitted, Request Number and Type will be populated in the operating order and control is returned to the work order system, upon pushbutton "RETURN TO W.O." is selected or, additionally, a new request may be created with the use of another search with Event 1, Facility 1, Eq. Num etc or "copy this wo's equipment/purpose to request" (see FIG. 7) or "create new request using these work orders" (see FIGS. 10 and 11) or simply push the "create new request" again and begin. (see FIG. 3)

4.0 Revise an OPERATING ORDER and Request

An Operating Order and request can be modified. The following steps will allow the requestor to add, delete, cancel an Operating Order and request from the work order system.
a) Display the Work Order in the Work Order Operation window.
b) Activate the request system using the OIS pushbutton in the Work Order Operation Window. OR activate the request system from a field in the Work Order called: Operating Order. The actual operating order/request no. can be displayed in the W.O. screen and double click on the number will start the request system.
c) The request system will look at the Work Order Number and search the request Work Order Table to determine if the work order number has been assigned to a request or an operating order number.
d) If a Request Number and Operating Order Number exists for the Work Order Number, the approved Operating Order will be displayed for modification.
e) If only a Request Number exists for the Work Order Number, the Operating Order Request will be displayed for modification.
f) If the Work Order Number is not found in the Operating Order table REQUEST SCREEN will be displayed for manual or automatic completion.
g) The system will then return to section 1.0 above, and follow the listed steps described there.

5.0 Revisions Allowed to the Operating Order and Request.

It should be noted that the specific status and sequence of change is user specific, as may be the screens, pushbutton designations and other features illustrated in this application and the user may customize these to their particular needs and industry. The description herein is for illustrative purposes and should in no way be interpreted as a limitation on the invention.

The following types of modifications can occur when the Operating Order Request and/or an Operating Order status is:
A. Draft: 1) This is a draft, seeking comments for removal of equipment on a specific date and time. Any modification can occur, by requester, job planner or any party involved in the preparation of the request. Result: informal approval process of the Order is initiated because the limits of protection are not listed. The Order Status remains draft, until the requester submits the request to operations for review, the request status then changes to "draft waiting ok".

2) The Order request can be cancelled by requester, job planner or any party involved in the preparation of the request. Result: The order is placed in history.

B. Draft Waiting OK:

1) The operations department can modify the request or "ok" the request as submitted. Result: the request status changes to "draft ok".

B1. Draft OK: 1) The operations department first official review, seeking approval.

2) Revisions are allowed by all. Result: status remains draft ok.

C. Approve/Disapprove: 1) This is a second review, seeking approval. Any modifications can still occur, by all. However, if modified, the Order status will return to draft, for recirculation. If disapproved, operations provides a reason which can be viewed in the "approvals tab".

2) The request can be cancelled, and the request is then placed in history.

3) Result: when approved, the request officially becomes an Operating Order.

C1. Submit to ECC: 1) The request or operating order can be sent to higher level of operations for approval, such as at a central control center. The request is subject to major changes such as equipment unable to be removed from service to equipment can be removed from service but at low demand or off hours, such as from 12 midnight to 7:00 am.

2) Result: schedule can be extensively changed, resulting in disapproval or cancel or can be first approved.

D. Switching Order Prepare: 1) With each request, switches, breakers, valves, pumps, motors require a change in operating position. To turn off or turn on equipment or devices, operations prepares the "switching order". The "switching order" is stored in the request database for future use. When the request is approved, the switching order preparation can begin.

2) Result: status is changed to switching order is prepared.

E. Switching Order Review: 1) The prepared switching order is reviewed, independently.

2) Result: status is changed to switching order is reviewed. Result: tags are printed from the switching order.

F. Tags Hung: 1) Operations can modify the limits of Protection until the Tags are placed. Result: Order status will return to approve if limits of protection are changed, otherwise status remains Tags Hung.

G. Issue: 1) Operations has officially transferred responsibility of the zone protection provided by the approved operating order to the clearance holder and maintenance can begin safely. Clearance holder signs off on each Tag Hung and maintenance work begins. Result: Order status remains Issued.

H. Approved/Tags Hung/Issued:

1) Operations only can have the Order cancelled and rescheduled.

2) Result: the Order will return to approve.

I: RELEASE The clearance holder surrenders the clearance to operations. All work stops. result: Operations removes tags and closes out operating order.

J: REISSUE The operating order can be released and then reissued to another or same clearance holder to test the completed work. Result: operations reissues the operating order.

K: TAG REMOVE Operations removes the tags from all equipment and devices.

L: CLOSED Operations closes out the operations order. Result: Saved as standard for equipment, Saved as a standard for PM, saved and archieved in history database.

M. Work Order:

A work order number can be added, deleted to any request and operating order at any status by any requestor or operator.

N. Operating Orders:

For operating Orders that can NOT be revised by the Requestor, because security provided the system may provide a message window for text entries. The message window may come up automatically. The Requestor will provide in text format the revisions required for the associated Operating Order. The text message window will attach to the request under review. All users are controlled by built in security features that provide "rights" to each screen/field.

6.0 Execution of Operating Order and Revision(s)

Upon completion of revisions, the Submit to Operations button is pushed. The following occurs when the order status is:

A) Draft/Draftwaiting OK/Draft: The Request Number remains the same for the originally assigned request number. A canceled request is placed in history with draft status: revised date and time. The revised Order Request follows the request approval process.

B) Approve: The original operating Order Number remains. The revised approved Order becomes a new Order Request with status: Draft. The original approved order number is not increment and not used on any other order.

C) Tags Hung: The revisions to limits of protection are not allowed. If limits change, the order returns to approve. The Order number does not change from the original Order.

D) Issue: The revisions to switching order are preferably easily viewed by operations as a revised input. The Order number does not change from the originally approved Order. The original Order status changes to Approve.

E) "Approval" Tab: The approval window lists the status changes, date, time, type of change, change by whom with description. The update with each modification is automatic and is a "read only" file.

7.0 Update Work Order Tables

The request system will continuously update the work order tables with each execution of the agree/save button. The request system will protect the data until the Tables are successfully populated. Work order numbers can be added or deleted to the operating order at any time until status is "closed". The work order table contents are listed in the work order table.

8.0 Request Approval

Upon approval/disapproval of an Operating Order by Operations, the system may transmit a notification message to the Requestor.

9.0 Operating Order Close Out and Archived

Upon completion of the maintenance work, the craftsperson will release him/herself from the operating order. At such time, status will be completed and the operator will be asked if the operating order should become a STANDARD and/or PM STANDARD. The operator may push the SAVE button which will initiate and populate the work order system's PM TABLE field, such as "PM17" with a unique "standard library request number". The purpose for populating the PM table is: each time the PM generates a work order, the unique "standard library request number" will automatically bring up the previously completed operating order request screen in the request system. The following message may for example appear: "the work order was a PM standard order attached to it. Would you like to use the PM standard operating order? Yes/No. The user will push the "yes" button and the request is completed for the users review. The user will be able to accept the previously completed operating order in its entirety and push the agree/save button and immediately return to the Work Order System. Or, the user may push the "no" button and elect to prepare a new request from scratch.

Alternately, the operator can decide to populate the tables later with an operating order that is currently in the system. The operator will enter the standard limits of protection screen (see FIG. 4) and enter the preventive maintenance number and assign the next standard number, and then hit "save".

A Work Order Table is accessible to the work order program and/or the request program. The Work Order Table will be populated with all the fields read from the work order table. The Table will be updated with each Work Order transaction as its request flows through the approval process. Parent and children Work Orders, work group, event 1, calendar, facility 1, equipment number will be individually listed with their associated request and Order Number. The Work Order Table will be used to control the revisions in the request system including Requests and Operation Orders from the work order system. All of this information can be viewed under the work order tab in the request screen or browse.

When the request is completed, the user will push "select request" and the user will view and/or edit the complete request. The user may otherwise push the "return to work order screen" button.

Upon control being returned to the work order screen, the user, planners, supervisors, craftspersons and others, can each determine the operating order status, limits of protection available, who has signed on to work under the operating order and other parameters unique to the operating order that is attached to a work order. The planner, supervisor, or craftspersons can each enter the work order number in the work order screen of the work order system and select a report called "request status" or may select an "operating order tab" or similarly named tab on the work order screen. The result set will be displayed without leaving the work order system to search for an operating order in the request system.

FIGS. 4-11 illustrate the different display screens, fields, tabs and action buttons available to the user.

FIGS. 12-26 illustrate in a logic flow diagram the various steps undertaken when using the system of the invention, and further illustrates the activities associated with the various displays available to the user.

The request system thus enables operations input into work order generation, such as shown in FIG. 28, which can be printed out locally or at remote locations, listing the request data for the reviewers' information, including such details as the status, reference numbers to protection requests or safety permits. Standards for placing lock-out tags, obtaining permits used for particular pieces of equipment need only be entered one time and then are available for recall when future work is to be undertaken. The opportunity to review/add to or modify these by operations provides an additional level of safety as there is less likelihood to overlook a specific safety precaution unique to a particular piece of equipment or to particular circumstances applicable at the time work is to commence.

By providing one or more operations interfaces, both local and remote approvals can be sought, via full access to the work order planning details, limits of protection available, in real-time, with approvals immediately communicated to the job planner via computer terminal. Text messages can also be included and displayed relevant to the particular work order.

For example, in addition to submission to operations, the completed operations and work orders can be submitted to outside contractors to coordinate work, of particular benefit on large projects. A further interface to a current inventory of tools, materials and supplies to confirm that these are available for use is also integrated into a higher level system. In such a case, the integration package can querry the current inventory database to confirm, for example, that gaskets of the right size and material are available to complete the job. If not available, the job planner has the opportunity to generate necessary material purchase orders for materials to complete the task, archiving the work order until the materials are available.

Using the present invention, optimized planning and execution of maintenance tasks is achieved through interactive exchange between maintenance and operations, and throughout the heirarchy of each. Operators, mechanics, supervisors and management can each participate and benefit from the interelated/interactive approach of the present invention.

While preferred embodiments of the present invention have been shown and described, it will be understood by those skilled in the art that various changes or modifications may be made without varying from to present invention.

The invention claimed is:

1. A computer based maintenance resource management system comprising:
   a user accessible computer terminal;
   a first software component for creating a job plan including standards;

a second software component for creating a work order;

an integration software component for automatically populating the work order with the job plan;

a third software component for generating a protection request based on the work order for securing the removal of equipment from service and associating the protection request with the work order;

an operation software component for displaying the protection request for approval by a user; and a user configurable third party interface for enabling third party interaction with the work order.

2. The maintenance resource management system of claim 1 wherein the integration software component further comprises means for searching data in an equipment database, a preventative maintenance and equipment database, a work order database, a job plan database and an operations database, and means for transferring data to and from the operations database to the second software component.

3. The maintenance resource management system of claim 1 further comprising a job standards database, accessible via the integration software component.

4. The maintenance resource management system of claim 1 further comprising at least one table selected from the group consisting of a preventive maintenance and equipment table, a work order table, a schedule table, a calendar table, a job plan table, a lockout table, a preventive maintenance and equipment scheduled activity table, a lockout table, a tag out table, a work order lockout table, a work order precaution table, a work order safety link table, a work order scheduled activity table, a work order tag lock table.

5. The maintenance resource management system of claim 1 further comprising a database accessible by the integration software component, wherein said database is selected from the group consisting of a job standard database, a job planning database, an operations requirements database and a safety requirement database.

6. The maintenance resource management system of claim 1 further comprising a management interface for enabling approval of the work order.

7. A computer based maintenance resource management system comprising:

a user accessible computer terminal;

a first software component for creating a job plan including standards;

a second software component for creating a work order;

an integration software component for automatically populating the work order with the job plan;

a third software component for generating a protection request based on the work order for securing the removal of equipment from service and associating the protection request with the work order;

an operation software component for displaying the protection request for approval by a user; and operations safety software that provides instructions for safely removing equipment from service and returning equipment to service.

8. A computer based maintenance resource management system comprising:

a user accessible computer terminal;

a first software component for creating a job plan including standards;

a second software component for creating a work order;

an integration software component for automatically populating the work order with the job plan;

a third software component for generating a protection request based on the work order for securing the removal of equipment from service and associating the protection request with the work order;

an operation software component for displaying the protection request for approval by a user; and means for generating and printing a work order containing details on equipment status, and further containing reference numbers to at least one protection request.

9. A method for generating a work order for a maintenance operation comprising:

providing a system including a first software component for creating a job plan including standards; a second software component for creating a work order; an integration software component for automatically populating the work order with the job plan;

wherein said first integration software component includes means for transferring data between the job plan and the work order;

providing a third software component for generating a protection request based on the work order for securing the removal of equipment from service;

providing an operation software component for displaying the protection request for approval by a user; and providing a user configurable third party interface for enabling third party interaction with the work order.

* * * * *